US012738680B2

(12) United States Patent
Gomyo

(10) Patent No.: US 12,738,680 B2
(45) Date of Patent: Sep. 15, 2026

(54) ELECTRICAL CONNECTOR AND SWITCHING DEVICE

(71) Applicant: ALPS ALPINE CO., LTD., Tokyo (JP)

(72) Inventor: Hideyuki Gomyo, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 358 days.

(21) Appl. No.: 18/408,028

(22) Filed: Jan. 9, 2024

(65) Prior Publication Data

US 2024/0145971 A1 May 2, 2024

Related U.S. Application Data

(63) Continuation of application No. PCT/JP2022/011146, filed on Mar. 11, 2022.

(30) Foreign Application Priority Data

Jul. 28, 2021 (JP) ................................ 2021-123568

(51) Int. Cl.
*H01R 13/11* (2006.01)
*H01H 21/04* (2006.01)

(52) U.S. Cl.
CPC ............. *H01R 13/11* (2013.01); *H01H 21/04* (2013.01)

(58) Field of Classification Search
CPC ................................ H01R 13/11; H01R 21/04
See application file for complete search history.

(56) References Cited

U.S. PATENT DOCUMENTS 12,547,202 B2 * 2/2026 Seino ........................ G05G 5/05
2025/0028348 A1 * 1/2025 Seino ..................... H01H 25/04

FOREIGN PATENT DOCUMENTS

JP 2007-149629 6/2007
JP 2012-190750 10/2012
WO 2021/070637 4/2021

OTHER PUBLICATIONS

International Search Report for PCT/JP2022/011146 mailed on May 17, 2022.

* cited by examiner

*Primary Examiner* — Neil Abrams
(74) *Attorney, Agent, or Firm* — IPUSA, PLLC

(57) ABSTRACT

An electrical connector includes: a metallic terminal member that is positioned inside a housing and that includes a pair of a first terminal part and a second terminal part, the first and second terminal parts facing each other and configured to sandwich an external terminal inserted into the housing from outside; and a block-shaped auxiliary member that is positioned to surround the first and second terminal parts inside the housing, and that, when the external terminal is inserted between the first and second terminal parts, rotates in response to a load produced by the external terminal and applied to the auxiliary member, thereby pushing the first terminal part in a direction to move away from the second terminal part.

9 Claims, 26 Drawing Sheets

ELECTRICAL CONNECTOR AND SWITCHING DEVICE

CROSS-REFERENCE TO RELATED APPLICATIONS

The present application is a continuation filed under 35 U.S.C. 111 (a) claiming the benefit under 35 U.S.C. 120 and 365 (c) of PCT International Application No. PCT/JP2022/011146, filed on Mar. 11, 2022, and designating the U.S., which is based on and claims priority to Japanese Patent Application No. 2021-123568, filed on Jul. 28, 2021. The entire contents of PCT International Application No. PCT/JP2022/011146 and Japanese Patent Application No. 2021-123568 are incorporated herein by reference.

BACKGROUND OF THE INVENTION

1. Field of the Invention

The present invention relates to an electrical connector and a switching device.

2. Description of the Related Art

Patent document 1 below relates to a switching device, and discloses a technique whereby an external terminal can be connected between a pair of elastic parts (terminal parts) that are provided facing each other inside a housing, by inserting the external terminal from outside the housing.

Related-Art Document

Patent Document

[Patent Document 1] Unexamined Japanese Patent Application Publication No. 2012-190750

SUMMARY OF THE INVENTION

Technical Problem

However, with the technique of patent document 1 described above, if the external terminal is positioned imprecisely and inserted into the housing without adjustment, the external terminal might get caught in the terminal part of the housing, and there is even a risk that the terminal part is pushed in by the external terminal and deformed plastically.

Solution to Problem

According to one embodiment, therefore, an electrical connector includes: a metallic terminal member that is positioned inside a housing and that includes a pair of a first terminal part and a second terminal part, the first and second terminal parts facing each other and configured to sandwich an external terminal inserted into the housing from outside; and a block-shaped auxiliary member that is positioned to surround the first and second terminal parts inside the housing, and that, when the external terminal is inserted between the first and second terminal parts, rotates in response to a load produced by the external terminal and applied to the auxiliary member, thereby pushing the first terminal part in a direction to move away from the second terminal part.

Advantageous Effects of the Invention

According to the one embodiment described above, therefore, even if the external terminal is positioned imprecisely, inserted into the housing without adjustment, and gets caught in the terminal parts, it is still possible to substantially prevent the terminal parts from deforming plastically, and insert the external terminal part between the pair of terminal parts appropriately.

DESCRIPTION OF THE PREFERRED EMBODIMENTS

One embodiment will be described below with reference to the accompanying drawings.

(Overview of Switching Device)

Figure 1:
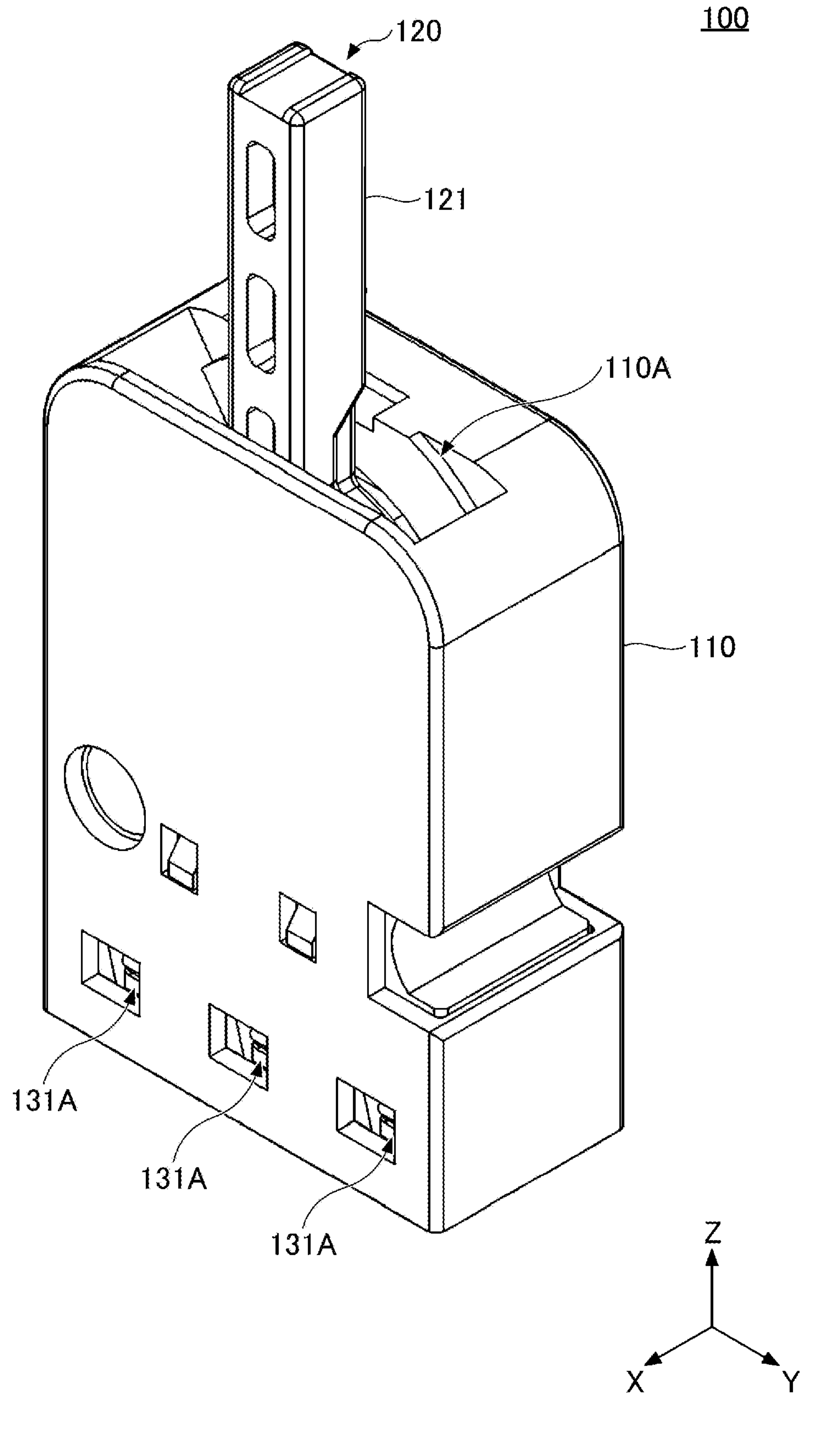
FIG. 1 is an external perspective view that shows the front side of a switching device according to one embodiment.
Figure 2:
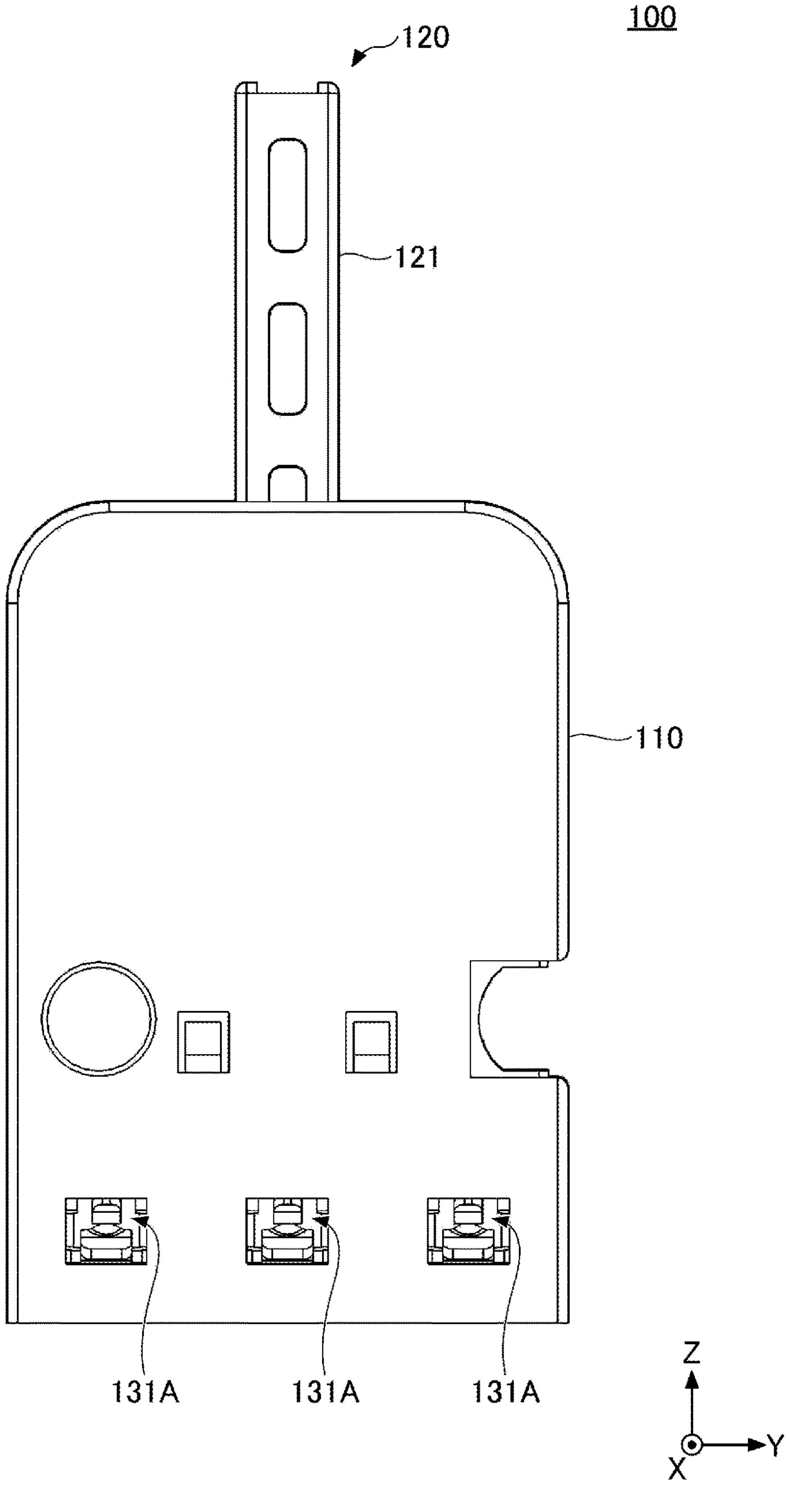
FIG. 2 is a front view of the switching device according to one embodiment.
Figure 3:
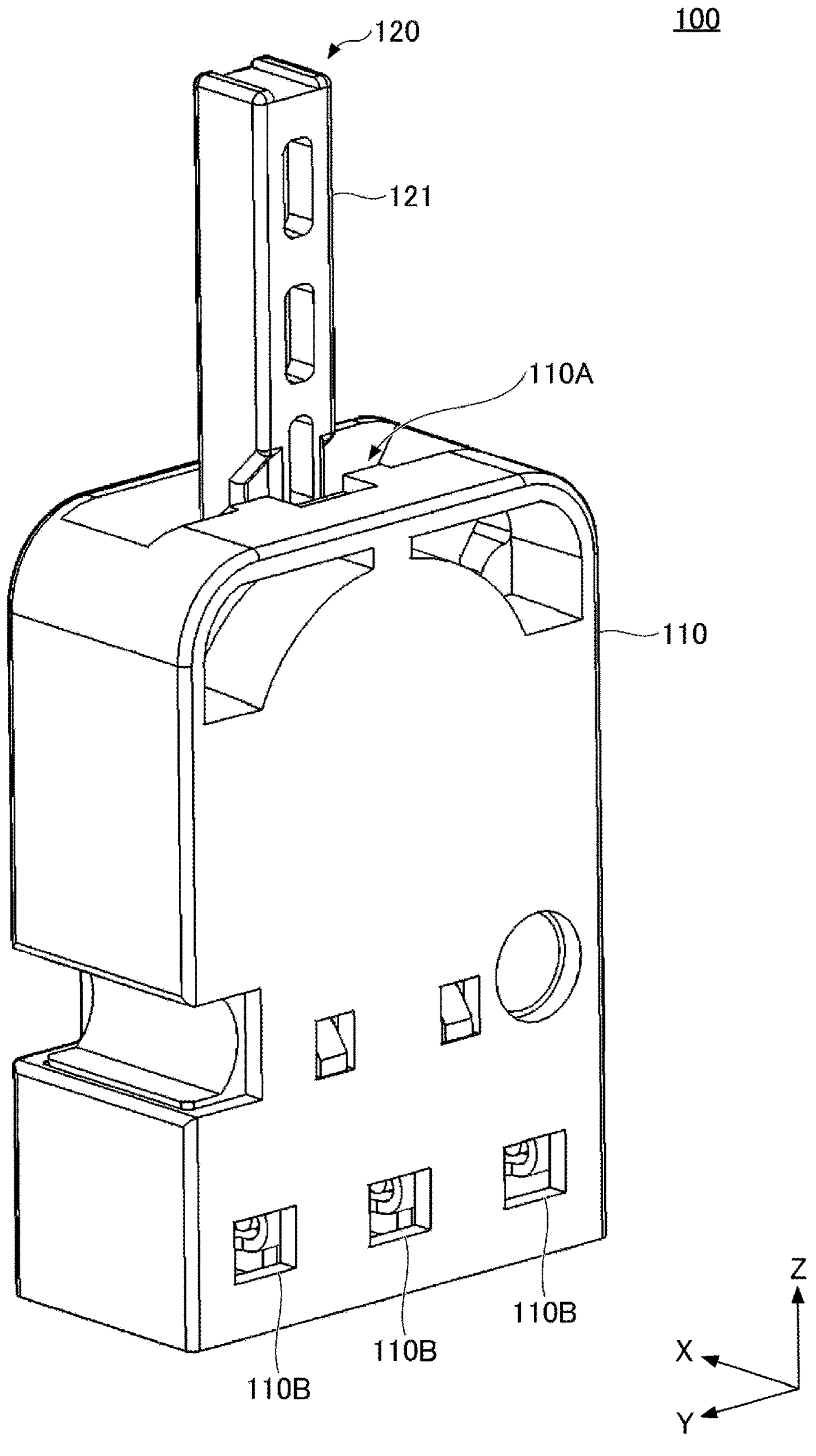
FIG. 3 is an external perspective view that shows the back side of the switching device according to one embodiment.

FIG. 1 is an external perspective view that shows the front side of a switching device 100 according to one embodiment. FIG. 2 is a front view of the switching device 100 according to one embodiment. FIG. 3 is an external perspective view that shows the back side of the switching device 100 according to one embodiment. As shown in FIG. 1 to FIG. 3, the switching device 100 includes a housing 110 and a lever 120.

The lever 120 is supported rotatably by the housing 110. The lever 120 is provided such that its operating part 121 protrudes upward (in the positive Z-axis direction) from an upper opening part 110A of the housing 110.

When the operating part 121 is operated to the right (in the positive Y-axis direction) viewed from the front side (the positive X-axis side), the lever 120 rotates clockwise, and the operating part 121 tilts to the right (to the positive Y-axis side).

On the other hand, when the operating part 121 is operated to the left (in the positive Y-axis direction) viewed from the front side (the positive X-axis side), the lever 120 rotates counterclockwise, and the operating part 121 tilts to the left (to the negative Y-axis side).

In a lower part inside the housing 110, three connectors 131A are provided side by side in the left-right direction (the Y-axis direction). The switching device 100 is designed such that a flat external terminal 20 can be connected to each of the three connectors 131A from outside the housing 110 (from the negative X-axis side), through three insertion holes 110B formed on the back surface of the housing 110.

When the lever 120 is not operated, the switching device 100 structured thus is in a switch-off state, in which the connector 131A located at the center in the left-right direction (the Y-axis direction) is not electrically connected with the other connectors 131A.

Also, when the operating part 121 of the lever 120 is operated to the right (in the positive Y-axis direction), the switching device 100 is in a first switch-on state, in which the connector 131A located at the center in the left-right direction (the Y-axis direction) is electrically connected with the connector 131A on the left (on the negative Y-axis side).

Also, when the operating part 121 of the lever 120 is operated to the left (in the negative Y-axis direction), the switching device 100 is in a second switch-on state, in which the connector 131A located at the center in the left-right direction (the Y-axis direction) is electrically connected with the connector 131A on the right (on the positive Y-axis side).

Note that, when the lever 120 of the switching device 100 stops being operated, the lever 120 automatically returns to its neutral position by the preloading force from a torsion spring 124, which will be described later. By this means, the switching device 100 automatically returns to the switch-off state.

(Structure of Switching Device)

Figure 4:
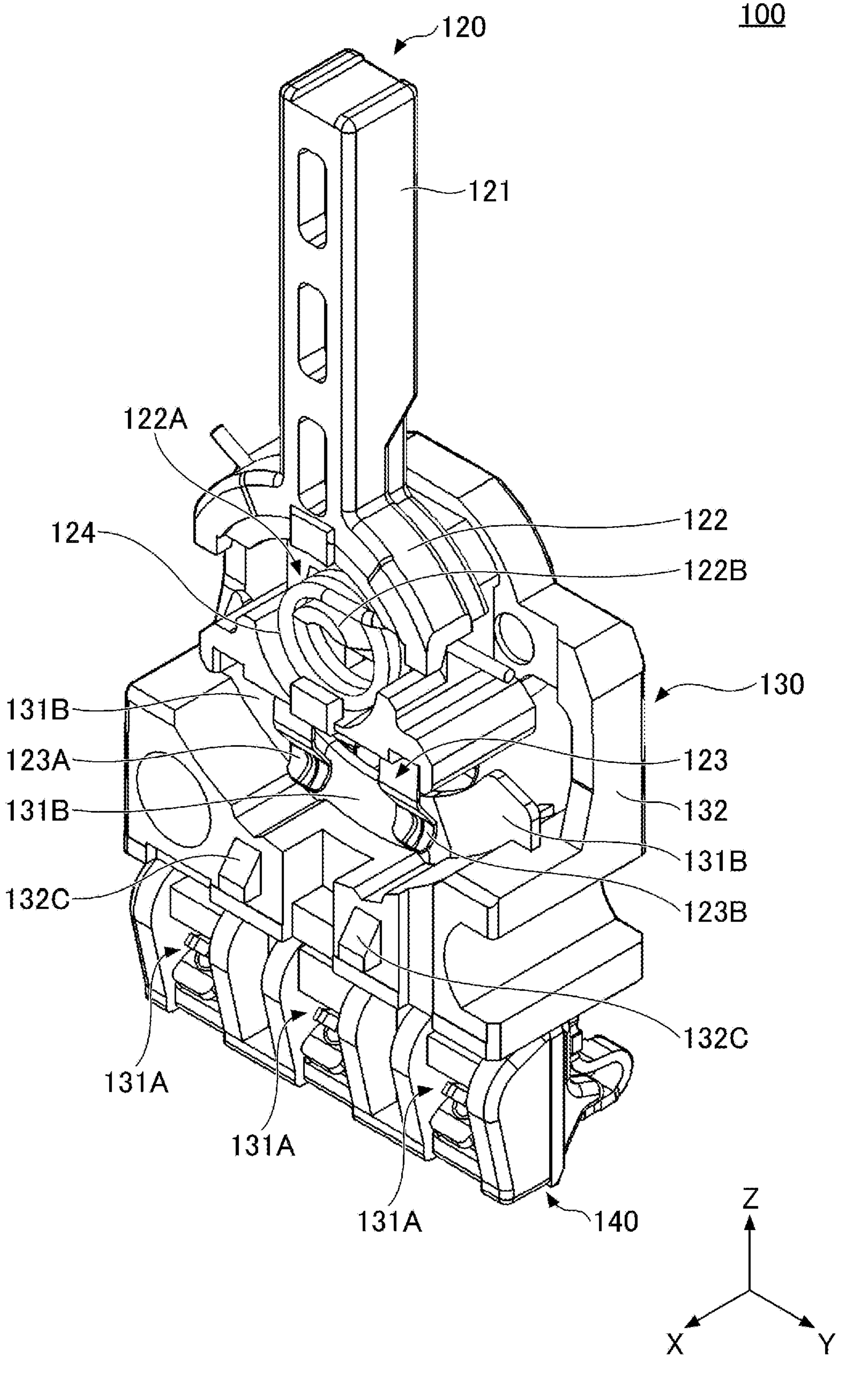
FIG. 4 is an external perspective view of the switching device (with the housing removed) according to one embodiment.
Figure 5:
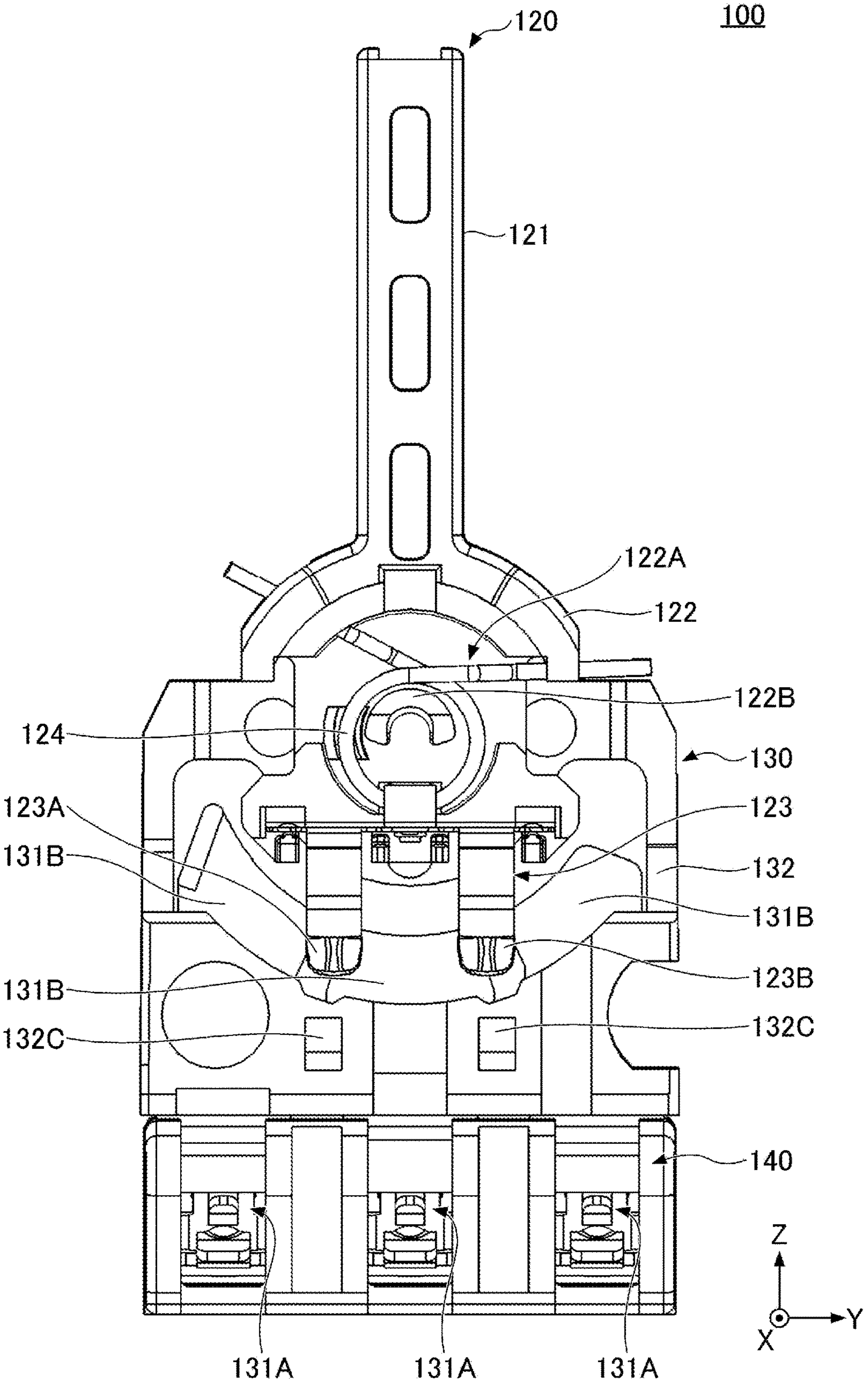
FIG. 5 is a front view of the switching device (with the housing removed) according to one embodiment.
Figure 6:
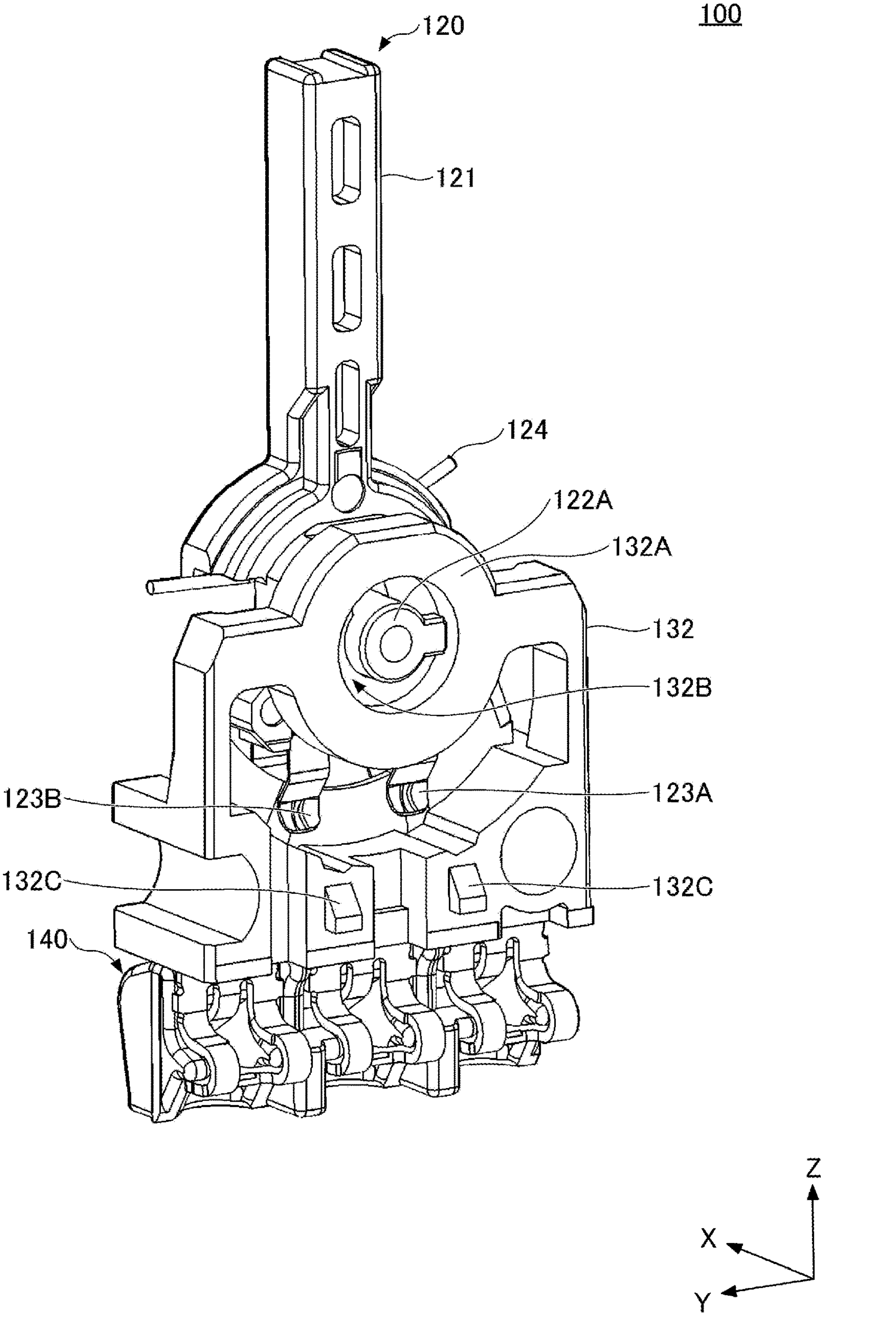
FIG. 6 is an external perspective view that shows the back side of the switching device (with the housing removed) according to one embodiment.
Figure 7:
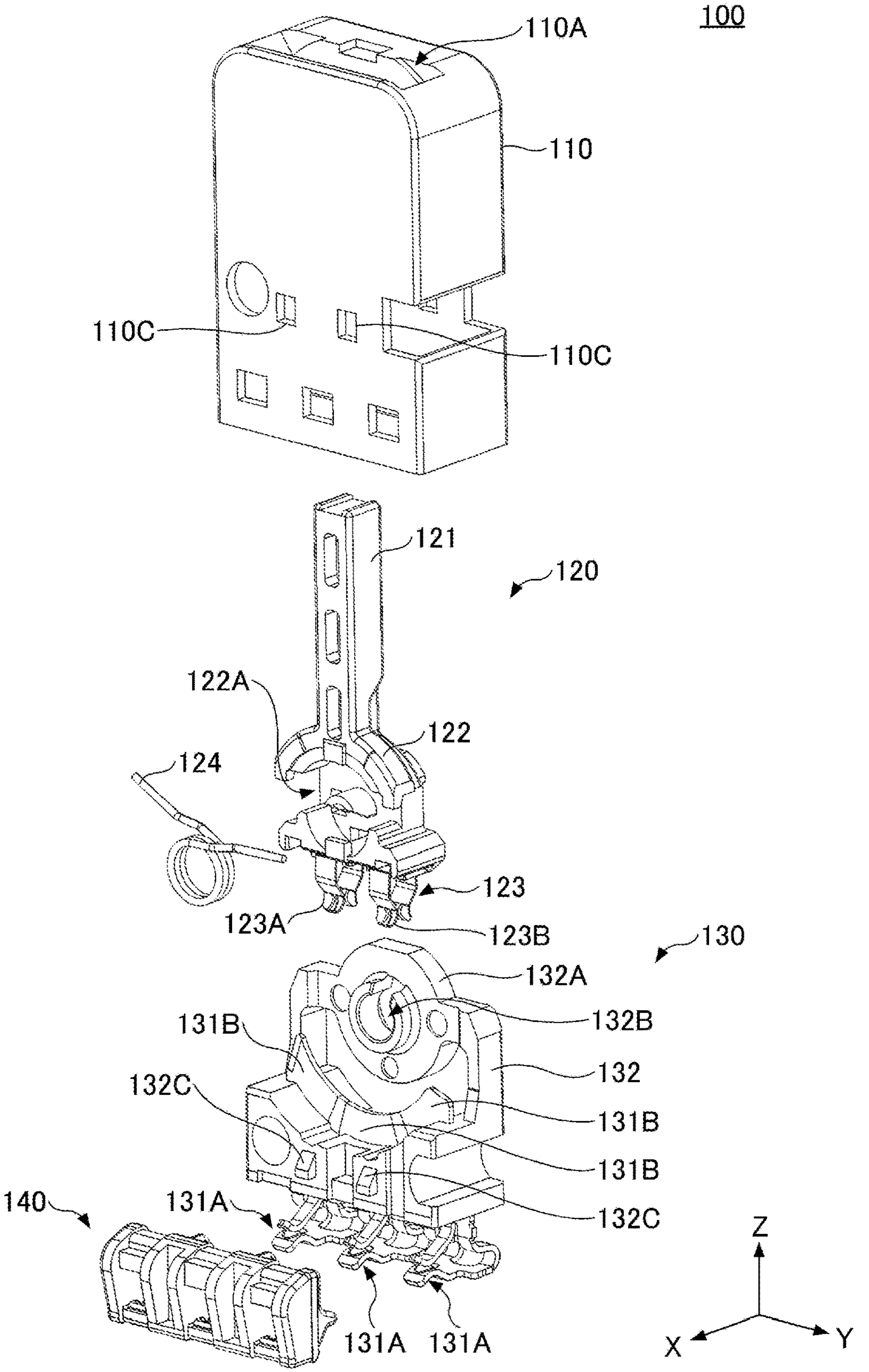
FIG. 7 is an exploded perspective view that shows the front side of the switching device according to one embodiment.
Figure 8:
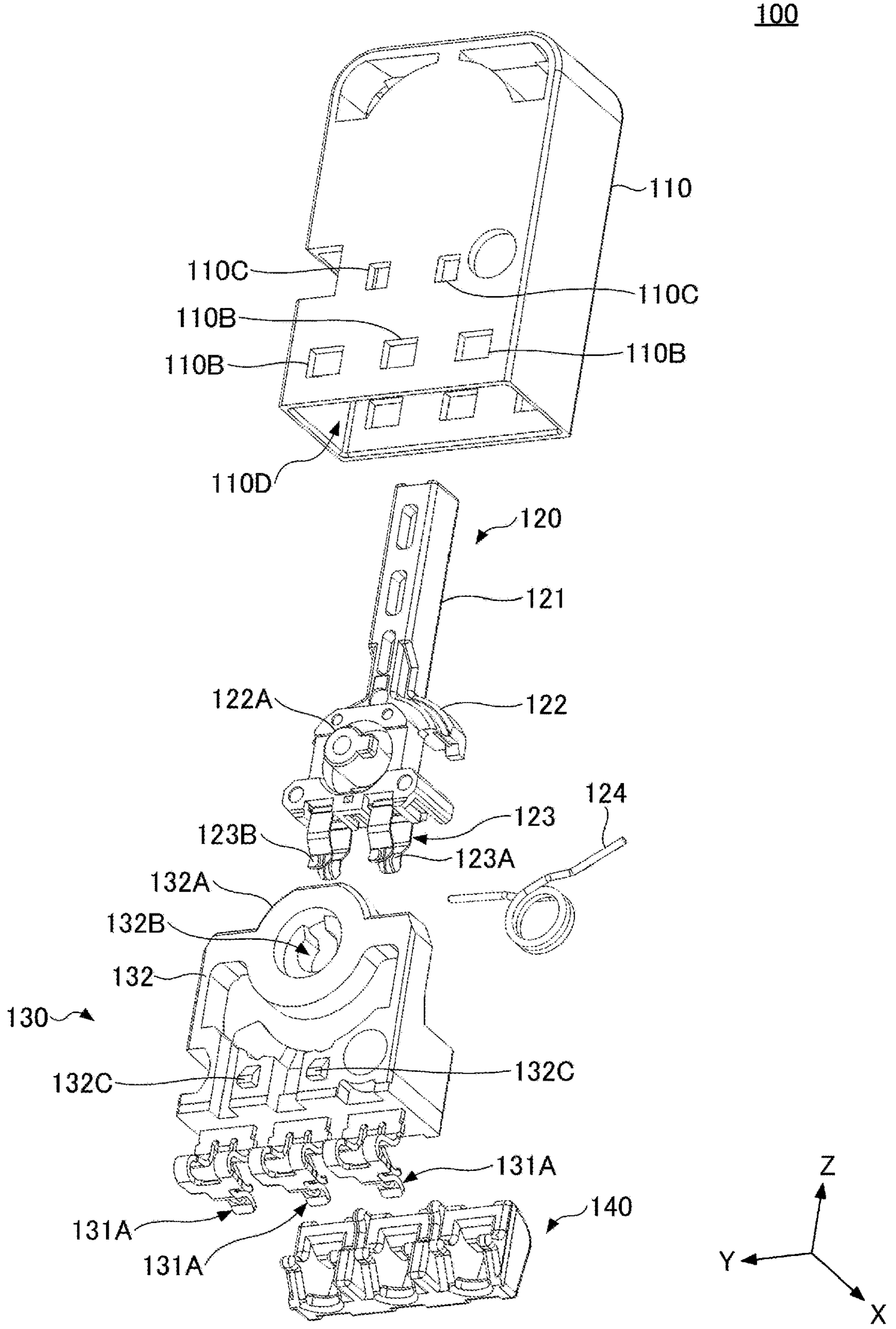
FIG. 8 is an exploded perspective view that shows the back side of the switching device according to one embodiment.
Figure 9:
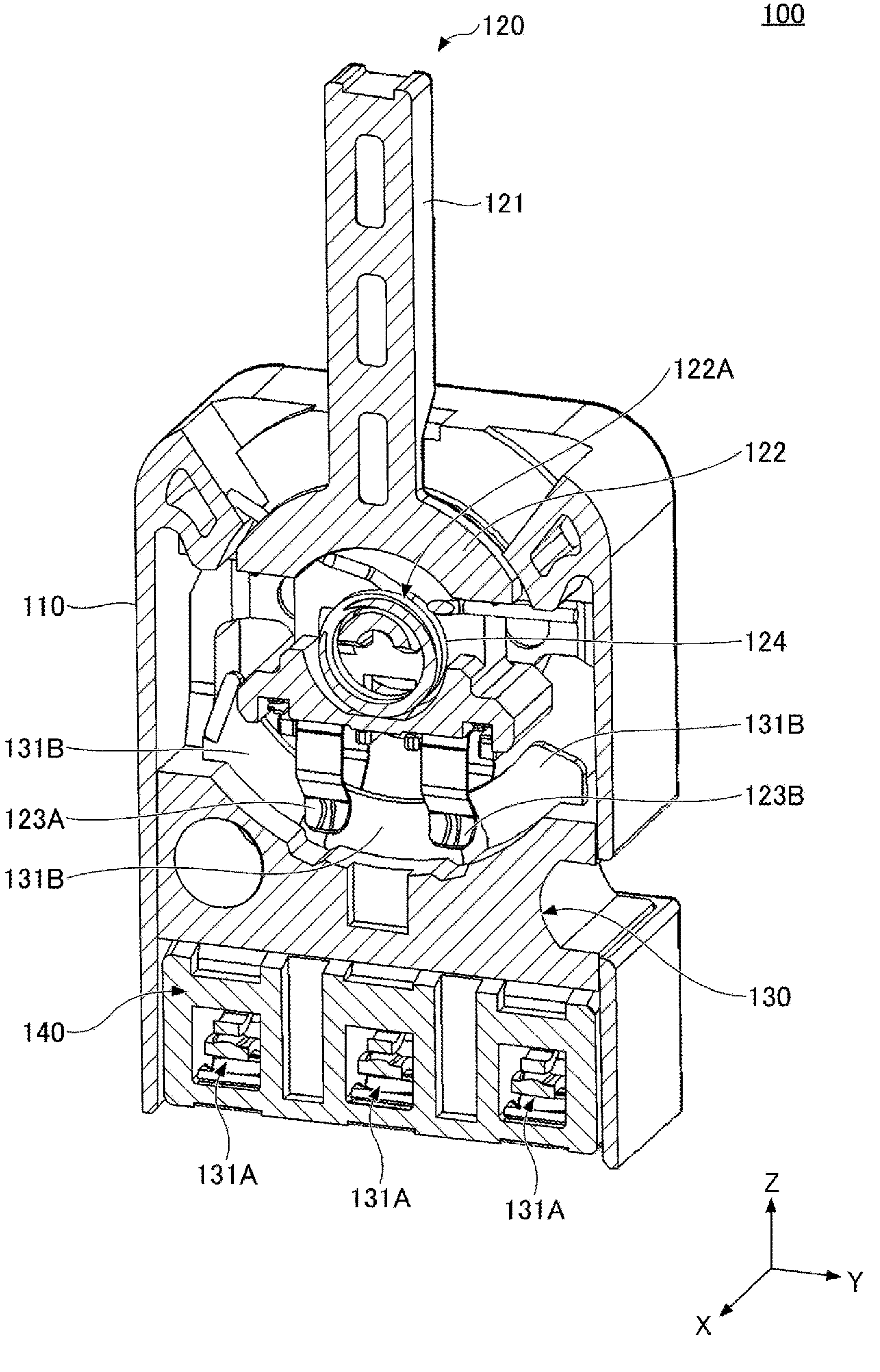
FIG. 9 is a cross-sectional view of the switching device according to one embodiment.
Figure 10:
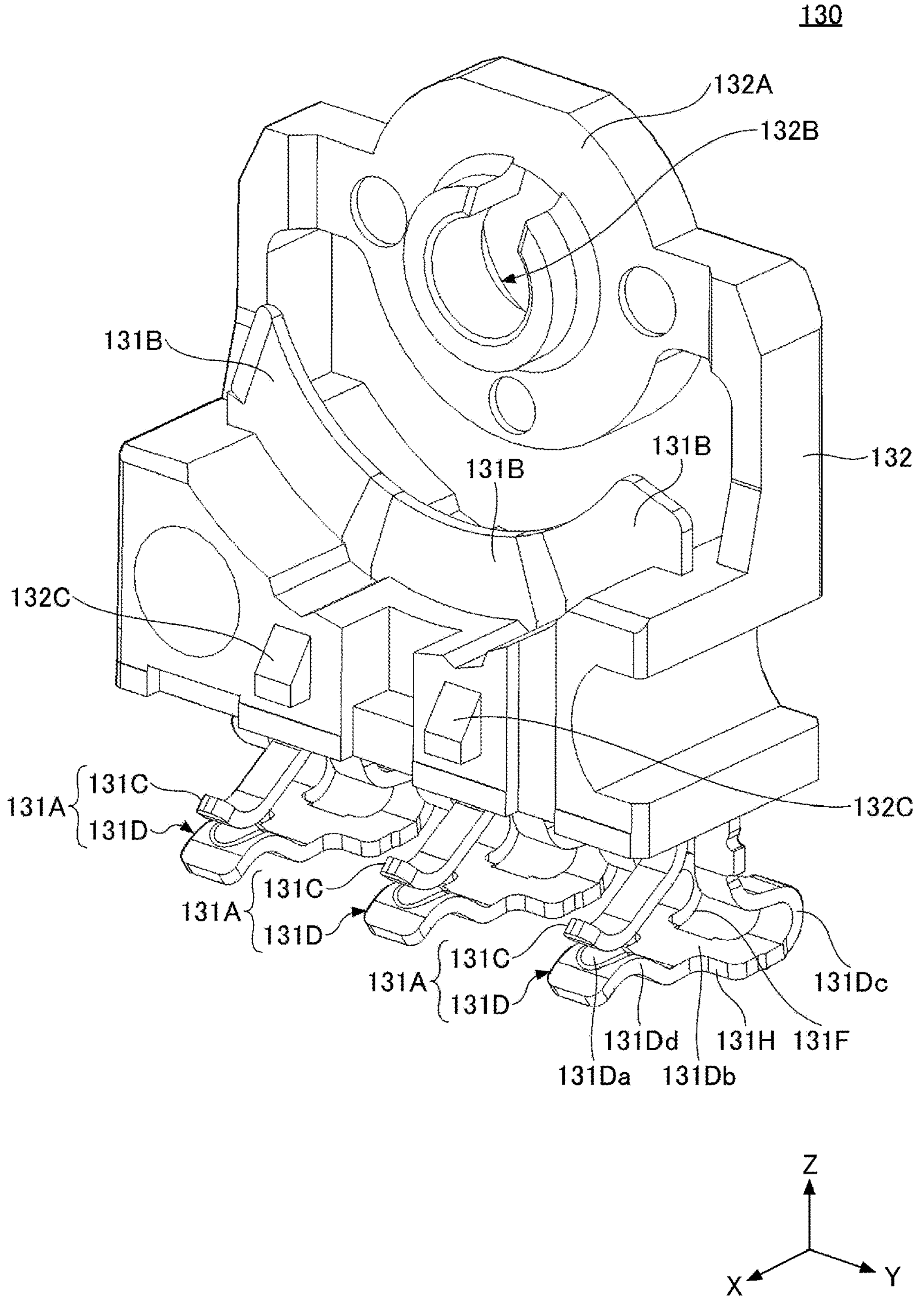
FIG. 10 is an external perspective view of a support body included in the switching device according to one embodiment.
Figure 11:
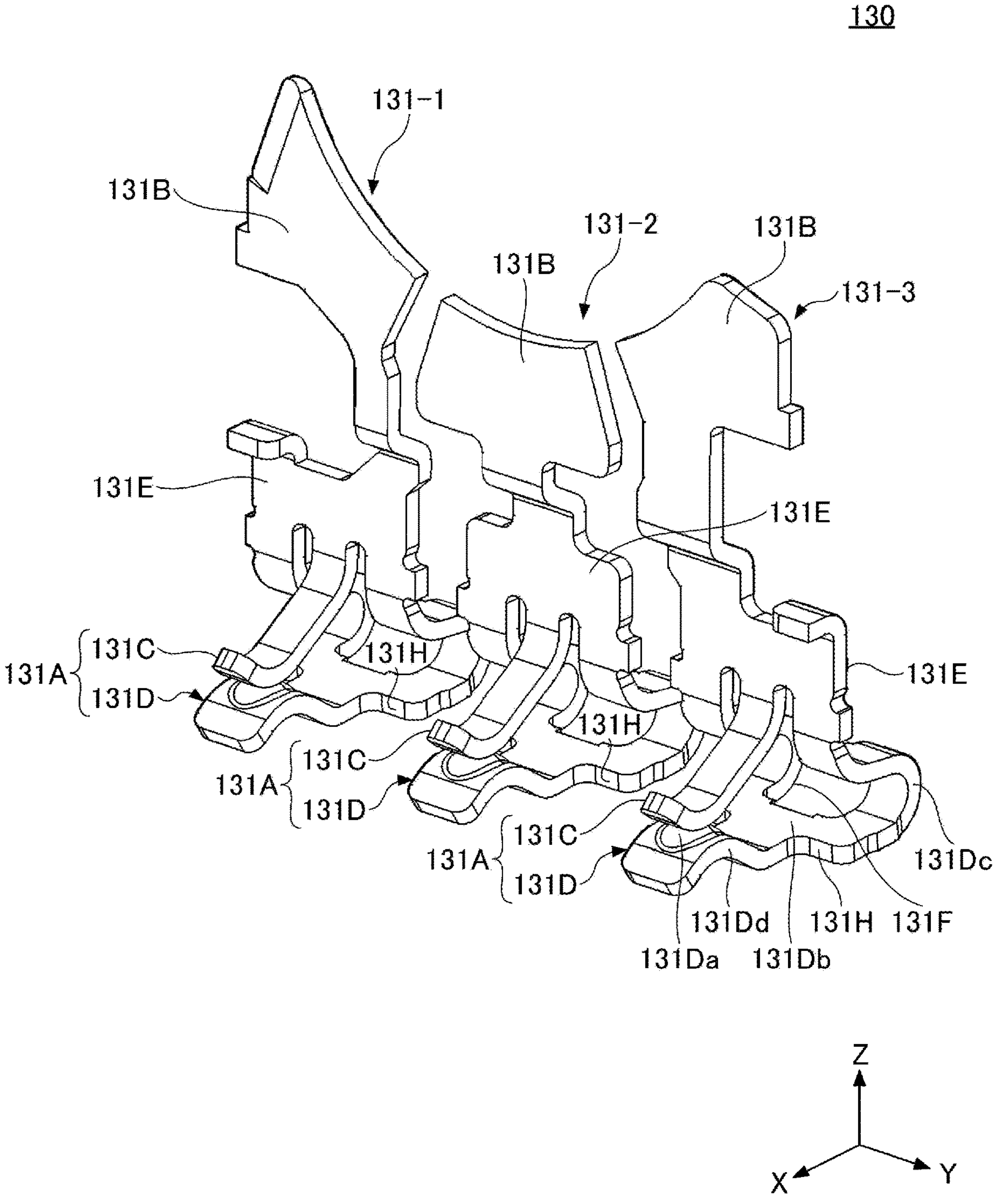
FIG. 11 is an external perspective view that shows the front side of the support body (with the resin part removed) included in the switching device according to one embodiment.
Figure 12:
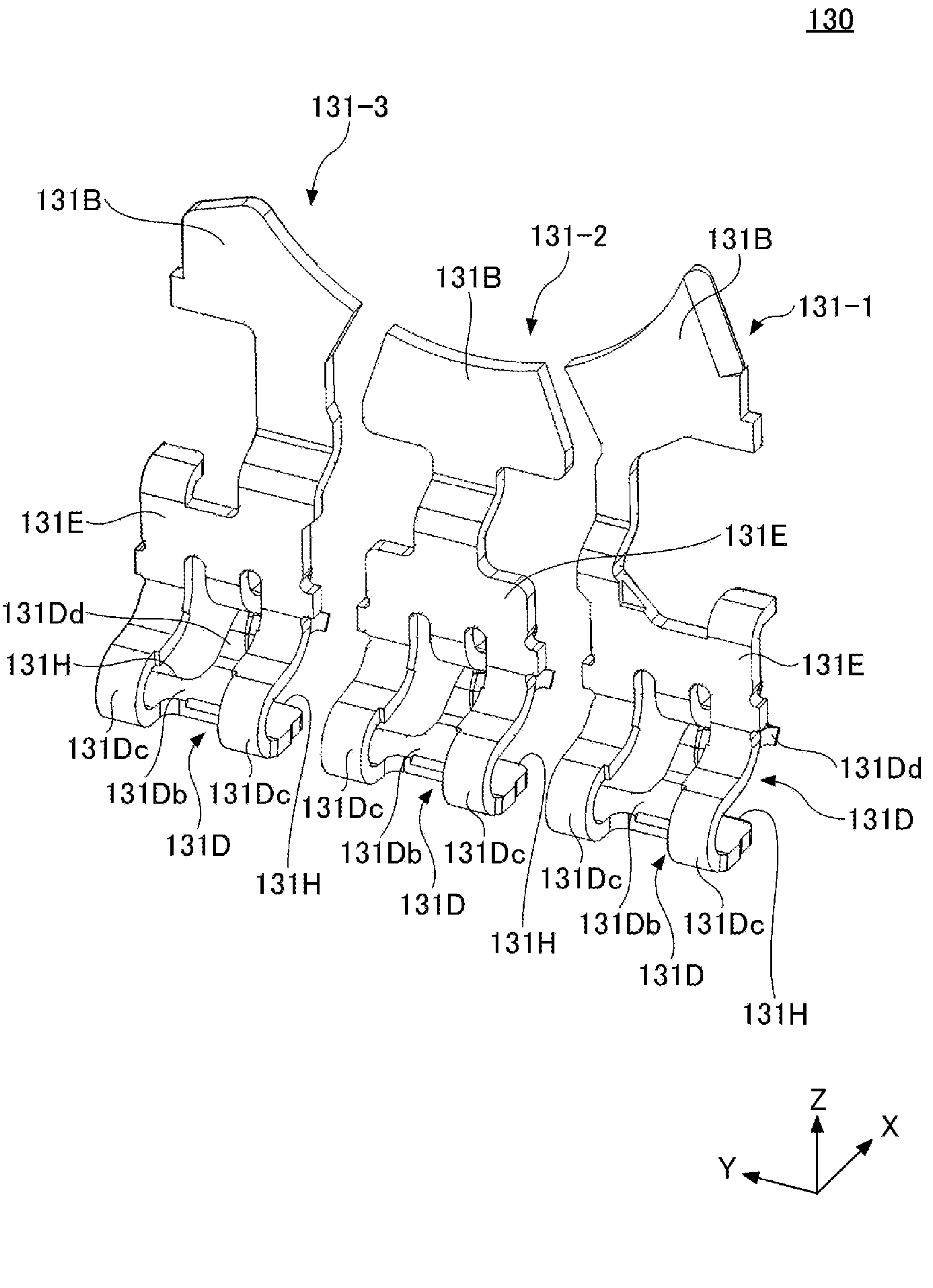
FIG. 12 is an external perspective view that shows the back side of the support body (with the resin part removed) included in the switching device according to one embodiment.

FIG. 4 is an external perspective view of the switching device 100 (with the housing 110 removed) according to one embodiment. FIG. 5 is a front view of the switching device 100 (with the housing 110 removed) according to one embodiment. FIG. 6 is an external perspective view that shows the back side of the switching device 100 (with the housing 110 removed) according to one embodiment. FIG. 7 is an exploded perspective view that shows the front side of the switching device 100 according to one embodiment. FIG. 8 is an exploded perspective view that shows the back side of the switching device 100 according to one embodiment. FIG. 9 is a cross-sectional view of the switching device 100 according to one embodiment. FIG. 10 is an external perspective view of a support body 130 included in the switching device 100 according to one embodiment. FIG. 11 is an external perspective view that shows the front side of the support body 130 (with the resin part 132 removed) included in the switching device 100 according to one embodiment. FIG. 12 is an external perspective view that shows the back side of the support body 130 (with the resin part 132 removed) included in the switching device 100 according to one embodiment.

As shown in FIG. 3 to FIG. 5, the switching device 100 according to one embodiment includes a housing 110, a lever 120, a support body 130, and an auxiliary member 140.

<Housing 110>

The housing 110 is a box-shaped member, made of resin and having a hollow structure. The housing 110 generally has a rectangular parallelepiped shape, in which its longitudinal direction is the vertical direction (the Z-axis direction). An upper opening part 110A is formed in the upper surface of the housing 110. The operating part 121 of the lever 120 is inserted into the upper opening part 110A from inside the housing 110 and positioned therein. In a lower part of the back surface (the negative X-axis side surface) of the housing 110, three rectangular insertion holes 110B are formed side by side in the left-right direction (the Y-axis direction). An external terminal can be inserted in each of the three insertion holes 110B from outside the housing 110 (from the negative X-axis side).

<Lever 120>

The lever 120 is a resin member that the user can rotate and operate. The lever 120 includes an operating part 121 and a base part 122.

The operating part 121 is a quadrangular prism-shaped part that extends in the vertical direction (the Z-axis direction). The operating part 121 protrudes upward (in the positive Z-axis direction) from the upper opening part 110A of the housing 110, so as to be rotated and operated by the user.

The base part 122 is connected to a lower end of the operating part 121. The base part 122 is positioned inside the housing 110. A cylindrical shaft part 122A is provided on the back side of the base part 122. The base part 122 is inserted in a support hole 132B, where the shaft part 122A is formed in a support part 132A of the support body 130. By this means, the base part 122 is rotatably supported by the support part 132A of the support body 130 inside the housing 110.

A metallic movable contact member 123 is provided at the lower end of the lever 120. The movable contact member 123 is held by the base part 122, and rotates with the base part 122. The movable contact member 123 has a first movable contact part 123A and a second movable contact part B. The first movable contact part 123A and second movable contact part B are placed side by side in the left-right direction (in the X-axis direction), and both are shaped like clips and protrude downward (in the negative Z-axis direction). In a state in which the first movable contact part 123A sandwiches the left (the negative Y-axis side) slide contact part 131B and the center slide contact part 131B from the front and back, and the first movable contact part 123A contacts the left (the negative Y-axis side) slide contact part 131B and the center slide contact part 131B in a sliding fashion. In a state in which the second movable contact part 123B sandwiches the right (the positive Y-axis side) slide contact part 131B and the center slide contact part 131B from the front and back, and the second movable contact part 123B contacts the right (the positive Y-axis side) slide contact part 131B and the center slide contact part 131B in a sliding fashion.

A concave part, having a round shape in plan view, is formed on the front side of the lever 120, and a torsion spring 124 is positioned in the concave part. Both ends of the torsion spring 124 engage with the inside of the housing 110 (see FIG. 9), so that, when the lever 120 rotates, a preloading force to preload the lever 120 back toward its original position is produced.

<Support Body 130>

The support body 130 is placed inside the housing 110. In the support body 130, three metallic terminal members 131 (metallic terminal members 131-1, 131-2, and 131-3) and a resin part 132 are provided integrally by insert molding.

The resin part 132 has a generally disc-shaped support part 132A in its upper part. A round support hole 132B is provided in the center of the support part 132A. A cylindrical shaft part 122A, which is provided on the back side of the base part 122 of the lever 120, is inserted in the support hole 132B, so that the support part 132A can support the lever 120 in a rotatable fashion.

Two engaging claws 132C are provided on both the front surface and the back surface of the resin part 132. The engaging claws 132C engage with engaging holes 110C formed in the front surface and back surface of the housing 110, so that the support body 130 is positioned and fixed in a predetermined position inside the housing 110.

The three metallic terminal members 131 are all formed by using a metallic plate, and have a shape obtained by processing the metallic plate. As shown in FIG. 10 and FIG. 11, the three metallic terminal members 131 are positioned side by side in the left-right direction (the Y-axis direction) without contacting one another. Also, as shown in FIG. 10 and FIG. 11, the three metallic terminal members 131 all have a part (middle part) thereof embedded in the resin part 132.

As shown in FIG. 10 to FIG. 12, each of the three metallic terminal members 131 has a connector 131A at the lower end (the end on the negative Z-axis side). That is, the support body 130 has three connectors 131A. The three connectors 131A are positioned side by side in the left-right direction (the Y-axis direction). In each connector 131A, a pair of elastic, arm-shaped terminal parts 131C and 131D are provided to face each other vertically. By inserting an external terminal between the pair of terminal parts 131C and 131D from outside the housing 110, the external terminal can be held between them, and can be electrically connected with them. The metallic terminal member 131 has a pair of terminal parts 131C and 131D integrally formed by processing a single metallic plate.

Figure 22:
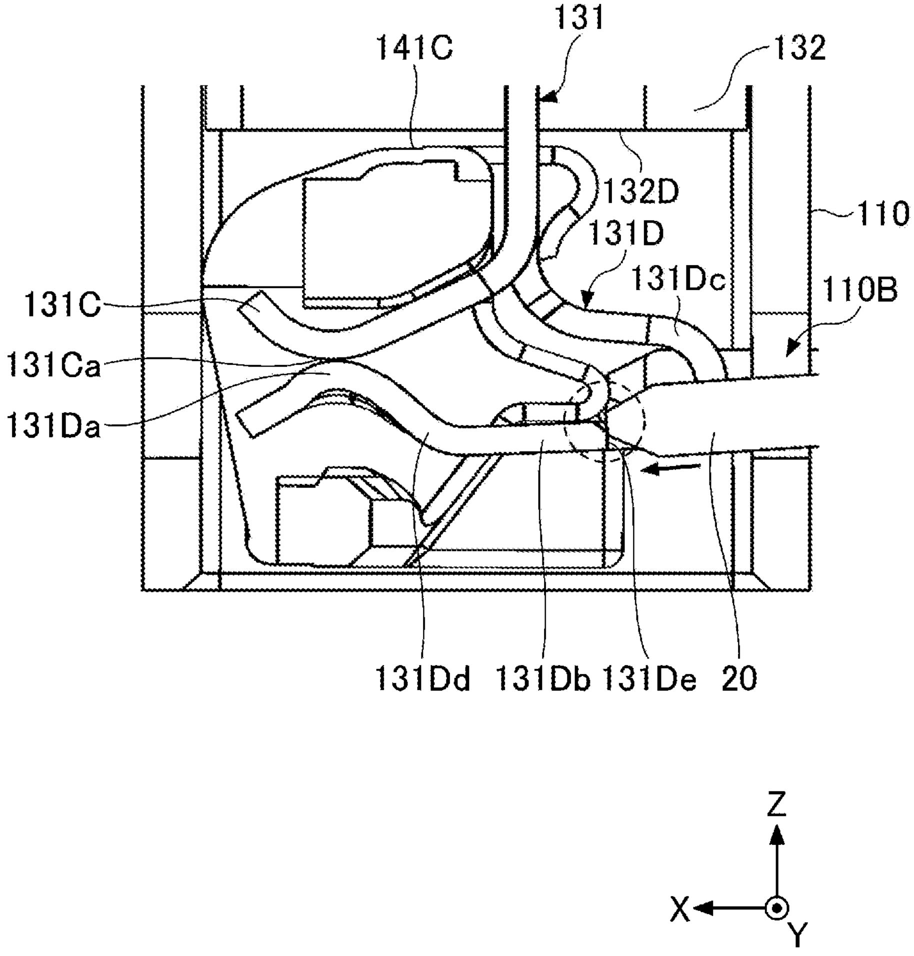
FIG. 22 is a partially enlarged cross-sectional view for explaining the operation of the auxiliary member in the switching device according to one embodiment.

Also, as shown in FIG. 11 and FIG. 12, each metallic terminal member 131 has a vertical, wall-shaped middle part 131E at the center in the vertical direction (the Z-axis direction). The middle part 131E is the part embedded in the resin part 132. The upper terminal part 131C is provided to extend forward (in the positive X-axis direction) and downward (in the negative Z-axis direction), diagonally, from the center part of the lower end of the middle part 131E. The tip of the terminal part 131C has a shape that is convexly curved downward (the negative Z-axis direction). A contact part 131Ca is provided at the top of the tip of the terminal part 131C (FIG. 22).

Also, in each metallic terminal member 131, the terminal part 131D has a pair of left and right fold-back parts 131Dc, which extend backward (in the negative X-axis direction) from the lower end of the middle part 131E, then fold back 180 degrees, and extend forward (in the positive X-axis direction). Also, the terminal part 131D has a coupling part **131*db* that connects the tips of the pair of fold-back parts 131Dc. Furthermore, the terminal part 131D has an extending part 131Dd that extends forward (in the positive X-axis direction) from the center of the coupling part 131*db* in the left-right direction (the Y-axis direction). The tip of the extending part 131Dd has a shape that is convexly curved upward (in the positive Z-axis direction). A contact part 131Da is provided at the top of the tip of the extending part 131**Dd.

Here, in each metallic terminal member 131, preloading parts 131H, which are fracture surfaces of the fold-back part 131Dc, are formed on both left and right outer sides of an extending part 131Dd in the terminal part 131D. The preloading parts 131H are parts that preload the auxiliary member 140 by contacting inclined parts 141A3 of the auxiliary member 140, which will be described later.

Also, as shown in FIG. 11, the three metallic terminal members 131-1, 131-2, and 131-3 each have a slide contact part 131B at the upper end (the end in the positive Z-axis direction). That is, the support body 130 has three slide contact parts 131B. The three slide contact parts 131B are positioned side by side in the left-right direction (the Y-axis direction), along the sliding path of the movable contact parts 123A and 123B of the movable contact member 123 on the same plane.

The left (the negative Y-axis side) slide contact part 131B of the metallic terminal member 131-1 is sandwiched by the movable contact part 123A, and is a part where the movable contact part 123A contact and slides in the circumferential direction, in conjunction with the rotation of the lever 120.

The central slide contact part 131B of the metallic terminal member 131-2 is sandwiched by the movable contact parts 123A and 123B, and is a part where the movable contact parts 123A and 123B contact and slide in the circumferential direction, in conjunction with the rotation of the lever 120.

The right (the positive Y-axis side) slide contact part 131B of the metallic terminal member 131-3 is sandwiched by the movable contact part 123B, and is a part where the movable contact part 123B contacts and slides in the circumferential direction, in conjunction with the rotation of the lever 120.

<Auxiliary Member 140>

The auxiliary member 140 is a block-shaped member that is made of resin and is placed so as to surround the three connectors 131A in the housing 110. Then an external terminal is inserted between the pair of terminal parts 131C and 131D of the connector 131A, the auxiliary member 140 rotates in response to the load produced by the insertion, so that the lower (the negative Z-axis side) terminal part 131D can be expanded downward (in the negative Z-axis direction). Details of the auxiliary member 140 will be described later. The auxiliary member 140 constitutes the "electrical connector" together with the three metallic terminal members 131.

(Structure of Auxiliary Member 140)

Figure 13:
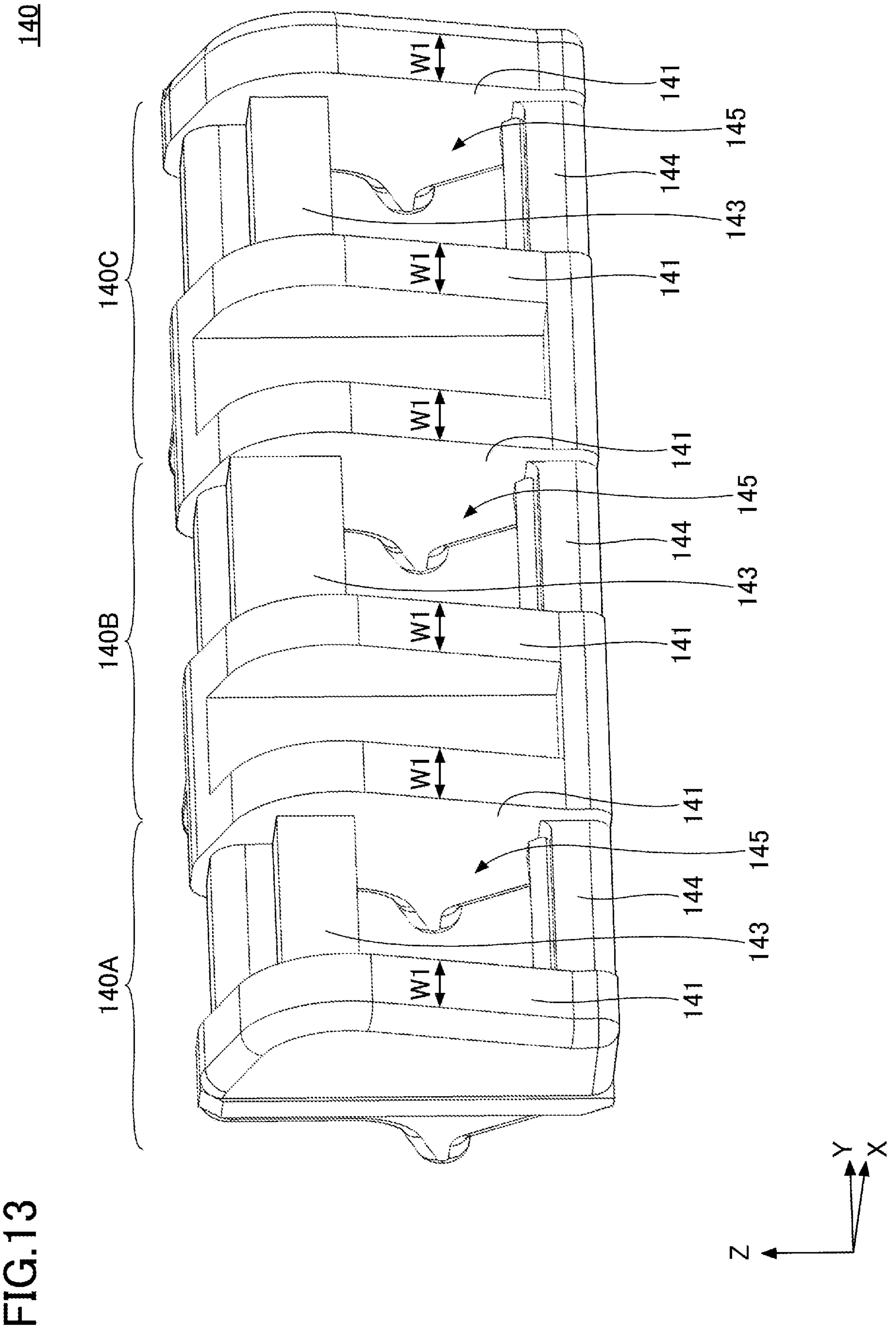
FIG. 13 is an external perspective view that shows the front side of an auxiliary member included in the switching device according to one embodiment.
Figure 14:
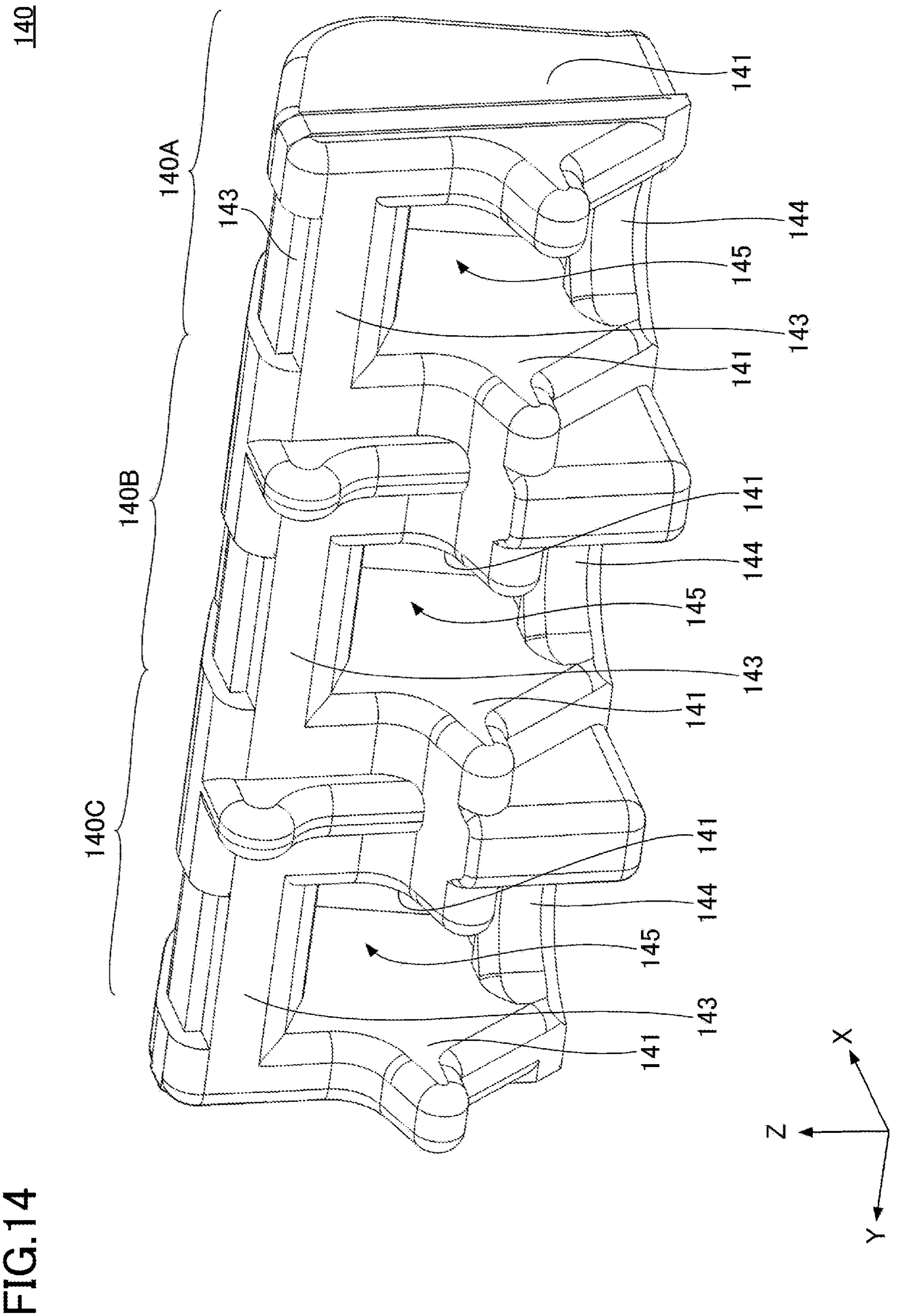
FIG. 14 is an external perspective view that shows the back side of the auxiliary member included in the switching device according to one embodiment.

FIG. 13 is an external perspective view that shows the front side of the auxiliary member 140 included in the switching device 100 according to one embodiment. FIG. 14 is an external perspective view that shows the back side of the auxiliary member 140 included in the switching device 100 according to one embodiment.

As shown in FIG. 13 and FIG. 14, the auxiliary member 140 includes, in order from the left (the negative Y-axis side), a first auxiliary member 140A, a second auxiliary member 140B, and a third auxiliary member 140C. The auxiliary member 140 has a block-like shape in which these three auxiliary members 140A to 140C are connected together. The three auxiliary members 140A to 140C all have the same structure. Note that the auxiliary member 140 is an example in which "multiple auxiliary members are positioned in one direction (in the Y-axis direction with the present embodiment) and connected with one another." The structure will be explained below by using the first auxiliary member 140A as a representative.

The first auxiliary member 140A has a pair of left and right sidewall parts 141. The sidewall parts 141 are vertical, wall-shaped parts. The pair of left and right sidewall parts 141 are bilaterally symmetrical in shape. The pair of left and right sidewall parts 141 are spaced apart from each other by a predetermined distance in the left-right direction (the Y-axis direction).

Also, the first auxiliary member 140A has an upper wall part 143 on the upper side (the positive Z-axis side) and a lower wall part 144 on the lower side (the negative Z-axis side). The upper wall part 143 and the lower wall part 144 are provided between the pair of left and right sidewall parts 141, and connect the pair of left and right sidewall parts 141.

By this means, the first auxiliary member 140A has an opening part 145 formed between the upper wall part 143 and the lower wall part 144, which allows the first auxiliary member 140A to be open in the X direction.

Figure 15:
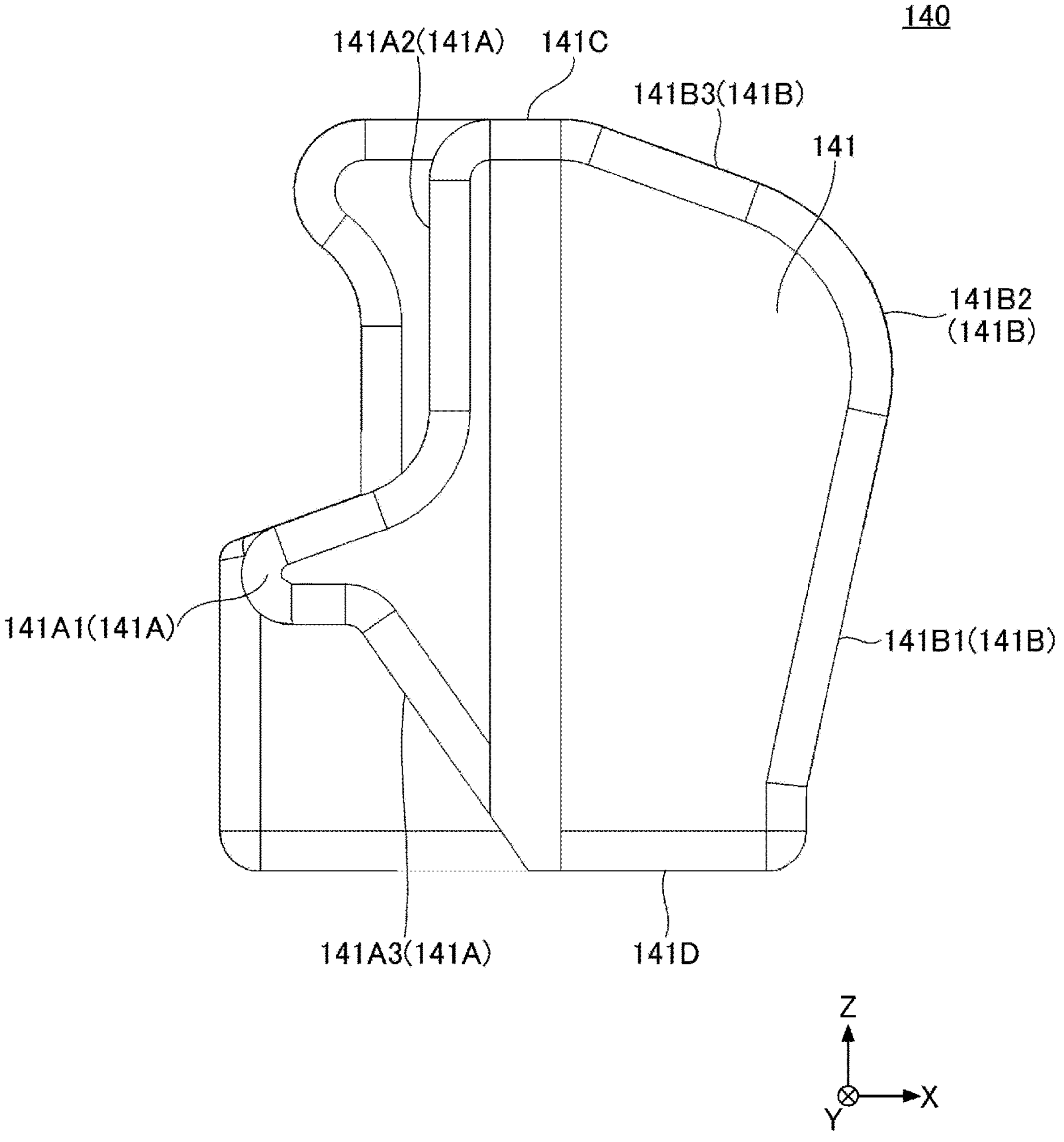
FIG. 15 is a side view of the auxiliary member included in the switching device according to one embodiment.

FIG. 15 is a side view of the auxiliary member 140 included in the switching device 100 according to one embodiment. Each sidewall part 141 has a certain width W1 (see FIG. 13) in the left-right direction (the Y-axis direction). By this means, each sidewall part 141 has a back surface 141A, a front surface 141B, an upper surface 141C, and a lower surface 141D, all having a width of W1.

The upper surface 141C and lower surface 141D are horizontal planes.

The back surface 141A has, at its center in the vertical direction (the Z-axis direction), a protruding part 141A1 that protrudes backward (in the negative X-axis direction).

Also, the back surface 141A has a vertical part 141A2 above the protruding part 141A1 (further in the positive Z-axis direction). The upper end of the vertical part 141A2 is connected to the upper surface 141C.

Also, the back surface 141A has, below the protruding part 141A1 (further in the negative Z-axis direction), an inclined part 141A3 that tilts downward and forward. The lower end of the inclined part 141A3 is connected with the lower surface 141D.

Also, the front surface 141B includes, in order from the bottom, a lower inclined part 141B1, a curved surface part 141B2, and an upper inclined part 141B3.

The lower inclined part 141B1 is provided so as to tilt downward (in the negative Z-axis direction) and backward (in the negative X-axis direction) from the curved surface part 141B2. The lower end of the lower inclined part 141B1 is connected to the lower surface 141D.

The upper inclined part 141B3 is provided so as to tilt upward (in the positive Z-axis direction) and backward (in the negative X-axis direction) from the curved surface part 141B2. The upper end of the upper inclined part 141B3 is connected to the upper surface 141C.

(Incorporation of Auxiliary Member 140)

Figure 16:
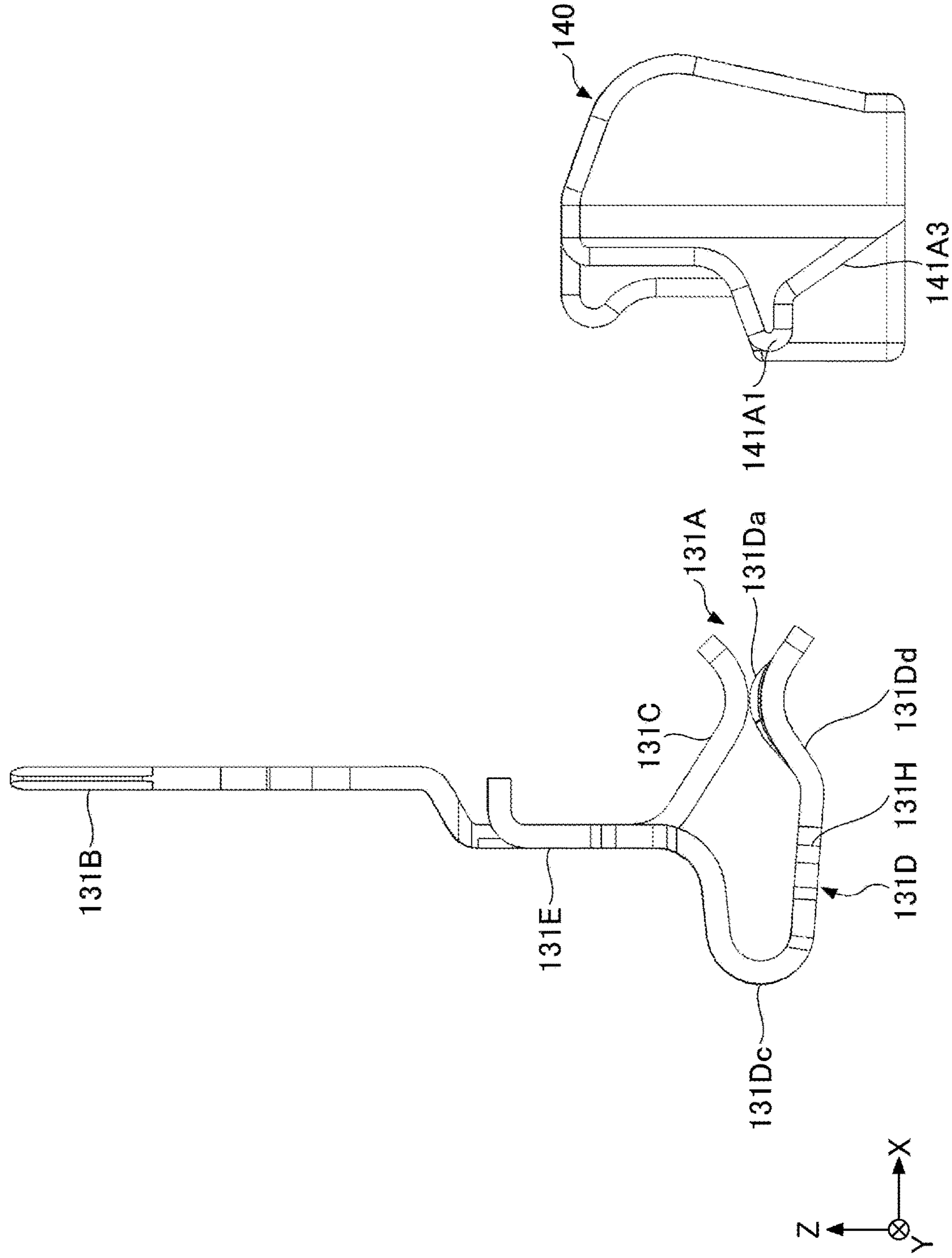
FIG. 16 is a side view that shows how the auxiliary member is incorporated in a metallic terminal member according to one embodiment.
Figure 17:
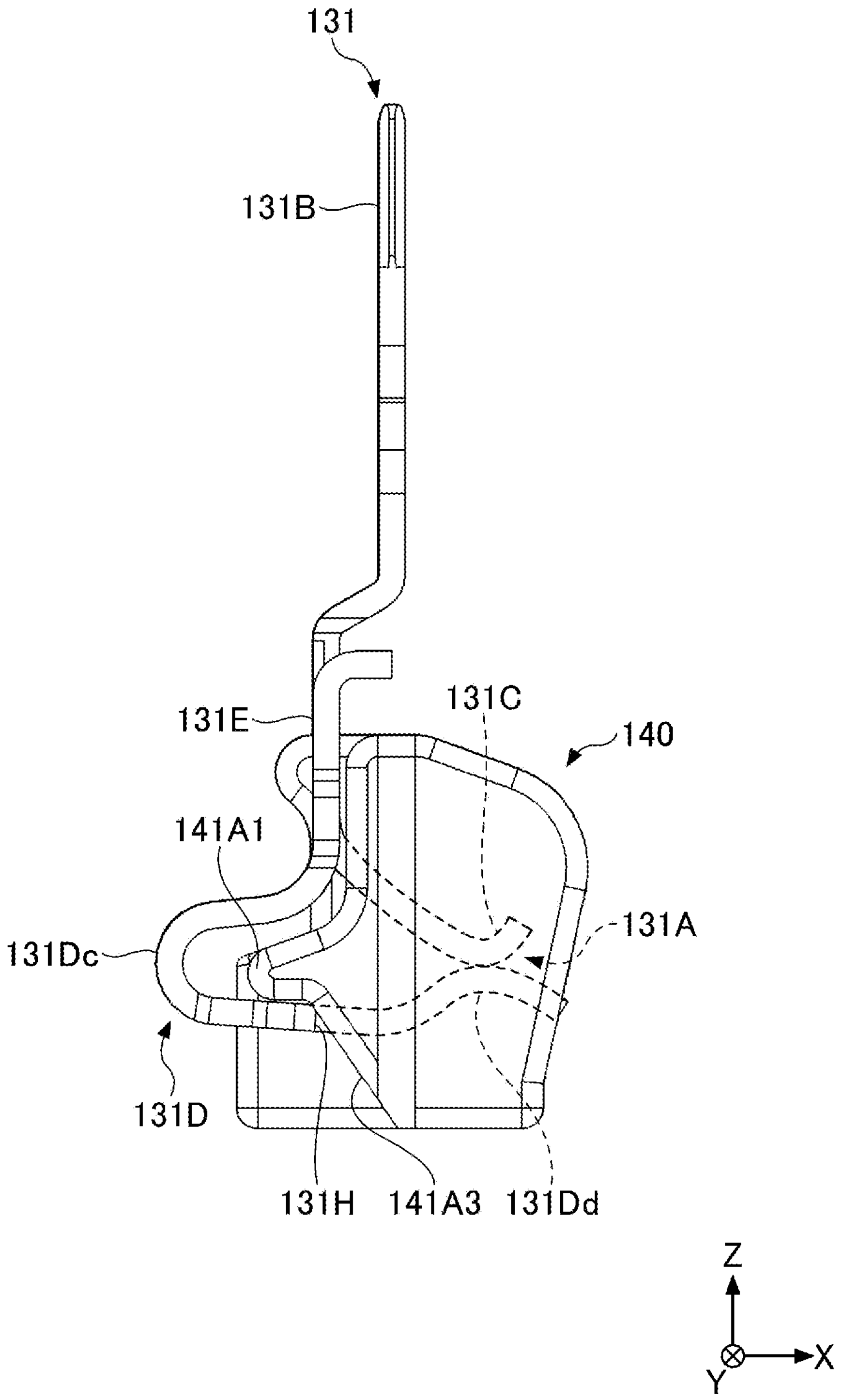
FIG. 17 is a side view that shows how the auxiliary member is incorporated in the metallic terminal member according to one embodiment.
Figure 18:
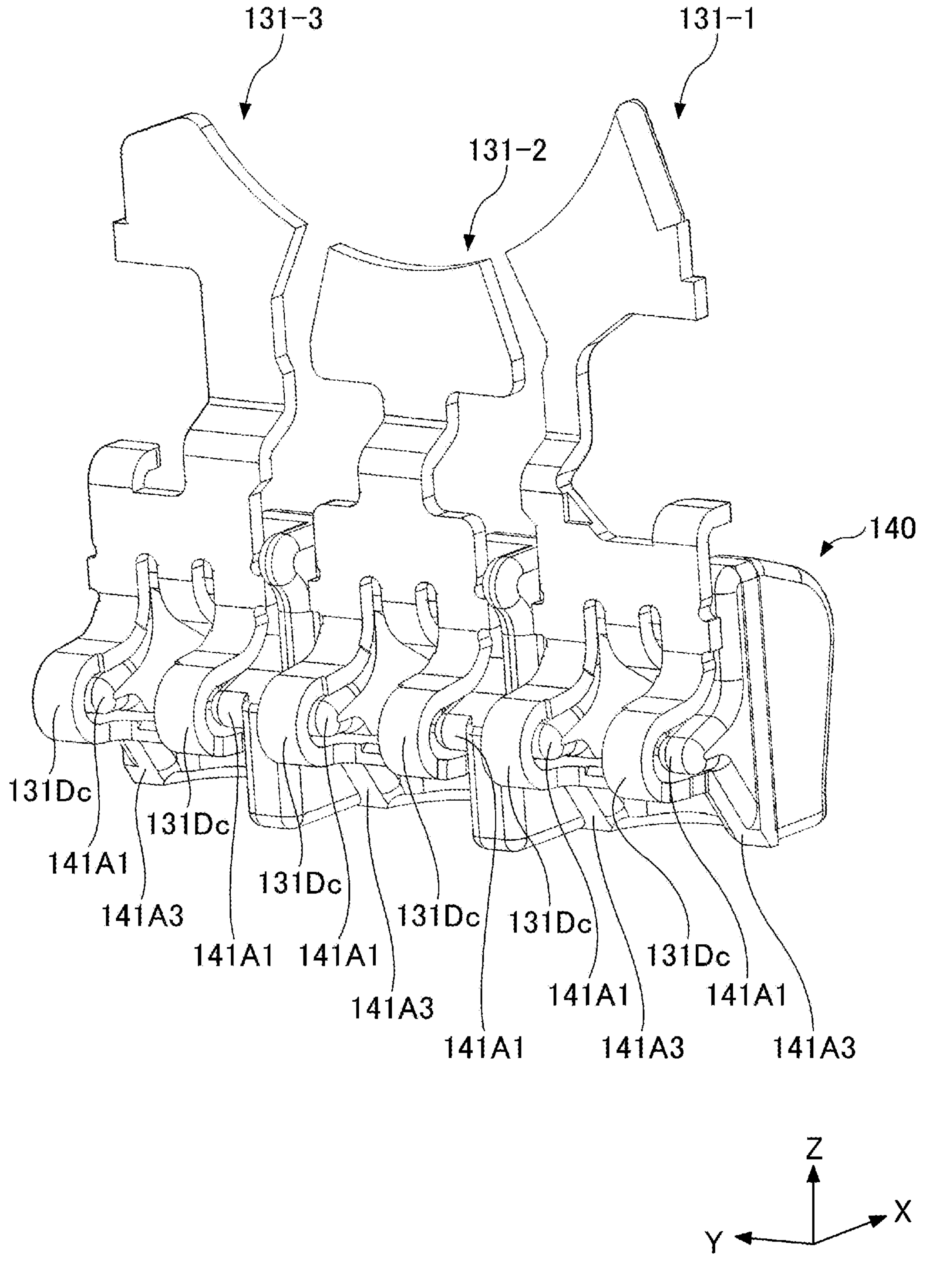
FIG. 18 is a partially enlarged perspective view that shows a state in which the auxiliary member is incorporated in the metallic terminal member according to one embodiment.
Figure 19:
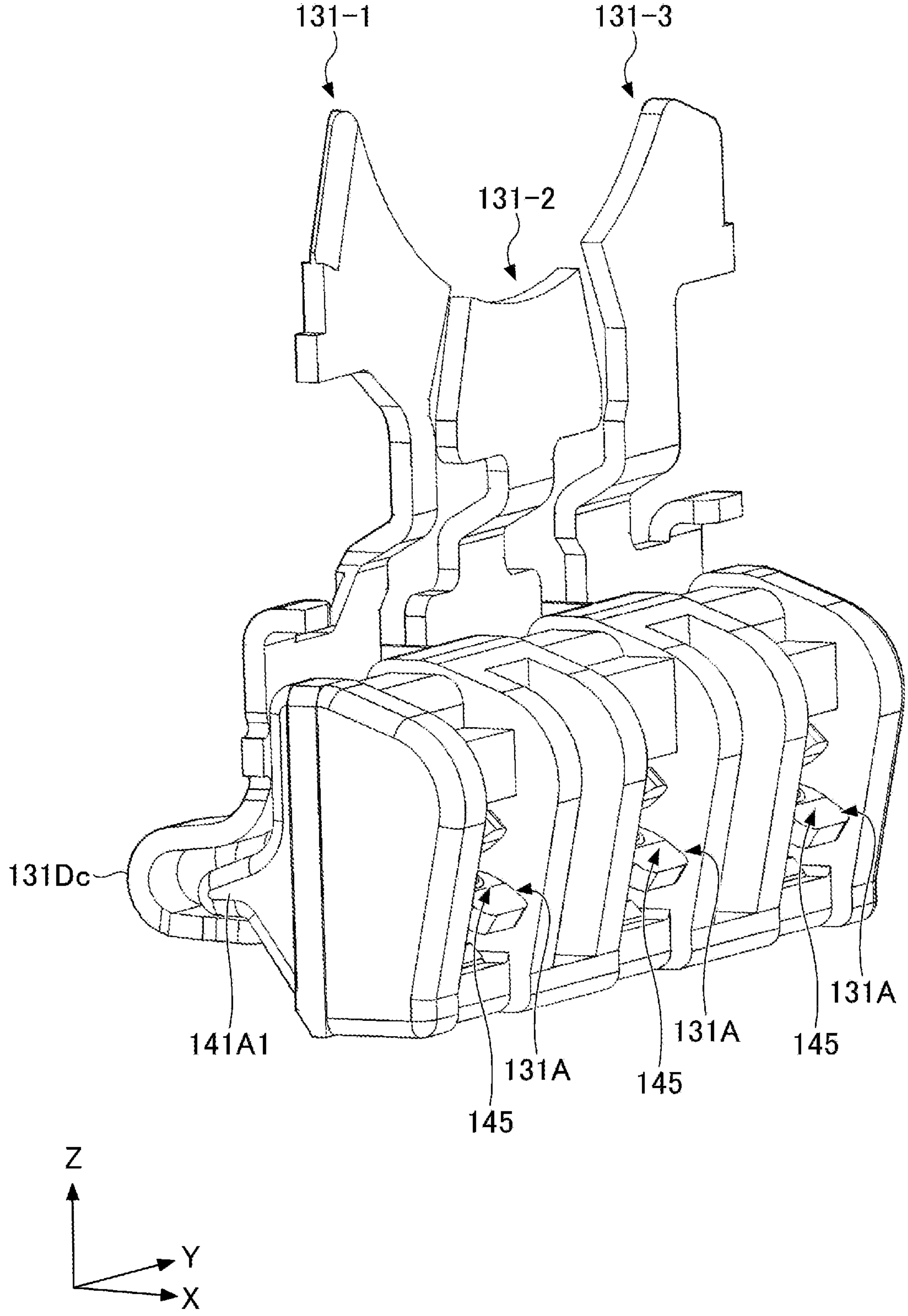
FIG. 19 is a partially enlarged perspective view that shows a state in which the auxiliary member is incorporated in the metallic terminal member according to one embodiment.

FIG. 16 and FIG. 17 are side views that show how the auxiliary member 140 is incorporated in the metallic terminal member 131 according to one embodiment. FIG. 18 and FIG. 19 are partially enlarged perspective views showing a state in which the auxiliary member 140 is incorporated in the metallic terminal member 131 according to one embodiment.

As shown in FIG. 16 to FIG. 18, the three connectors 131A, included in the three metallic members 131, are inserted in the three opening parts 145 of the auxiliary member 140, from the front of (from the positive X-axis direction in respect to) the three connectors 131A, so that the auxiliary member 140 is positioned to surround each of the three connectors 131A.

At this time, the protruding part 141A1 of the back surface 141A of the auxiliary member 140 is placed inside the fold-back part 131Dc of the terminal part 131D. Also, the inclined part 141A3 of the back surface 141A of the auxiliary member 140 hits the preloading part 131H at the tip of the fold-back part 131Dc.

(Positioning of Auxiliary Member 140 in Housing 110)

Figure 20:
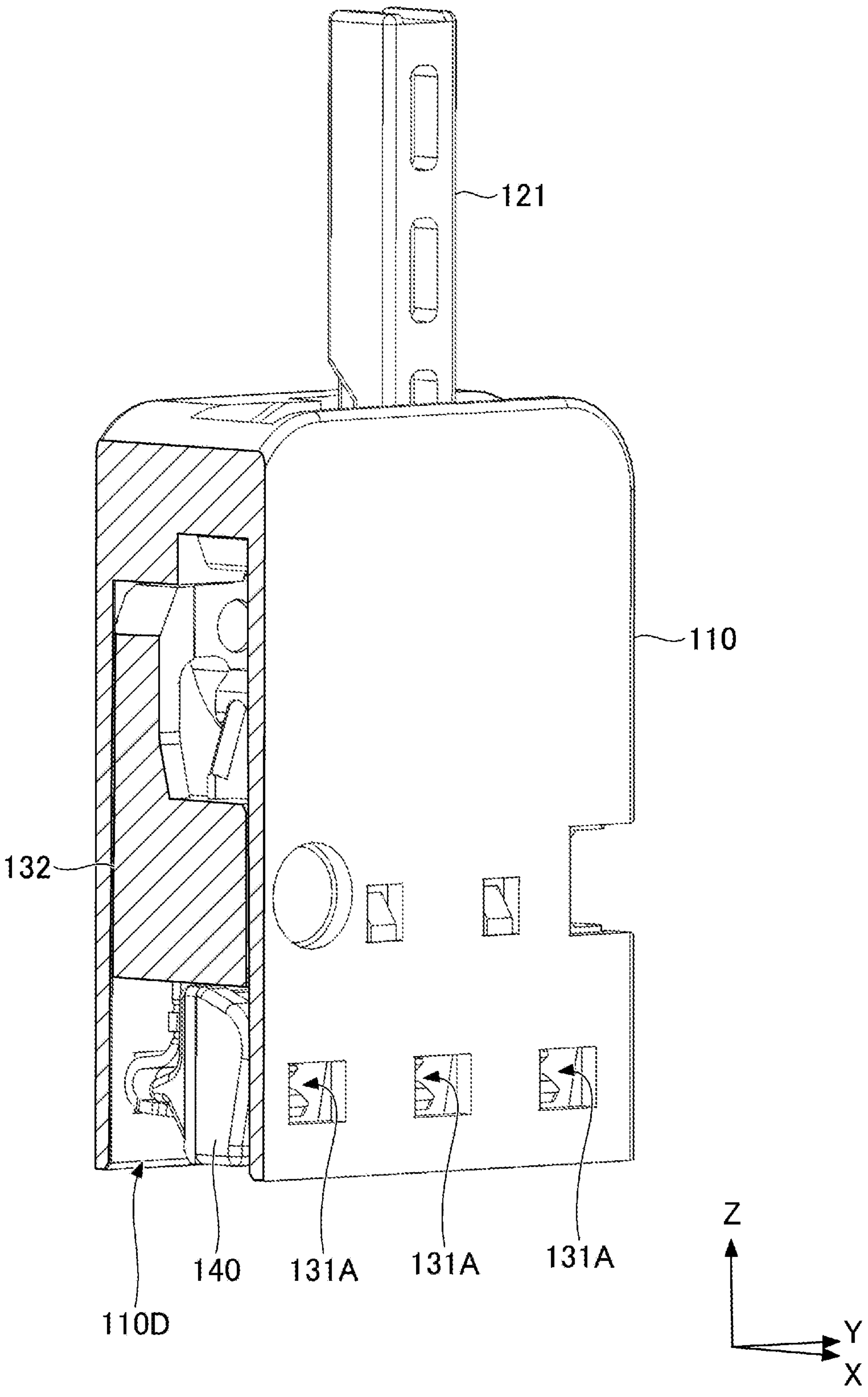
FIG. 20 is a cross-sectional view taken along an XZ plane of the switching device according to one embodiment.
Figure 21:
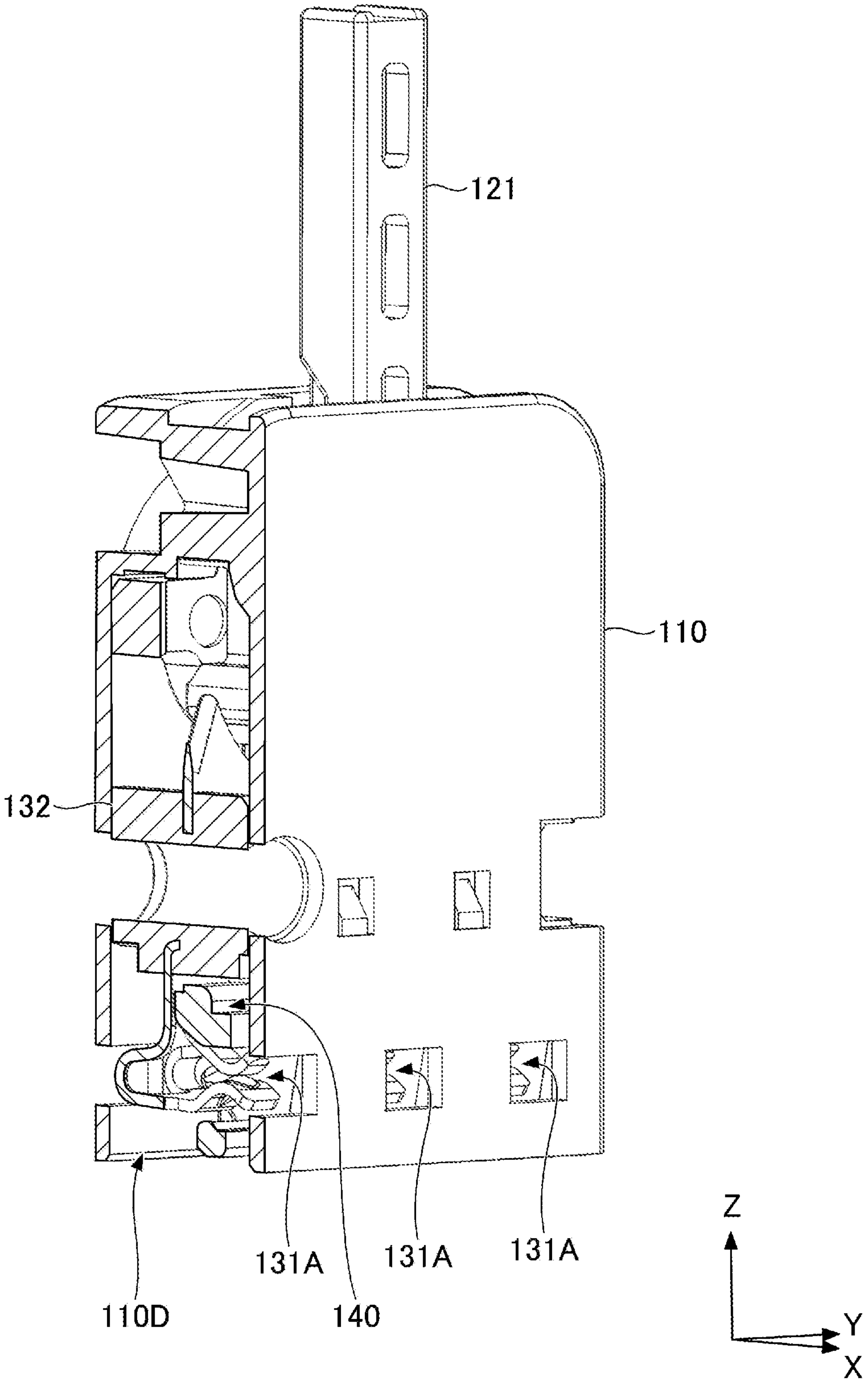
FIG. 21 is a cross-sectional view taken along an XZ plane of the switching device according to one embodiment.

FIG. 20 and FIG. 21 are cross-sectional views taken along the XZ plane of the switching device 100 according to one embodiment. As shown in FIG. 20 and FIG. 21, the auxiliary member 140 is incorporated in the three connectors 131A and placed, with the support body 130, in a space below the resin part 132 of the support body 130, inside the housing 110, from the lower opening part 110D of the housing 110.

(Operation of Auxiliary Member 140)

Hereinafter, the operation of the auxiliary member 140 in the switching device 100 according to one embodiment will be described with reference to FIG. 22 to FIG. 26. FIG. 22 to FIG. 26 are partially enlarged cross-sectional views for explaining the operation of the auxiliary member 140 in the switching device 100 according to one embodiment.

First, as shown in FIG. 22, the external terminal 20 is inserted into the housing 110, from the back side (the negative X-axis side) of the housing 110, through an insertion hole 110B provided on a surface of the housing 110. At this time, as shown by the broken-line circle in FIG. 22, the tip of the external terminal 20 might come into contact with the contact part 131De, which is the rear-side (the negative Y-axis side) fractured surface of the coupling part 131*db* of the terminal part 131D.

Figure 23A:
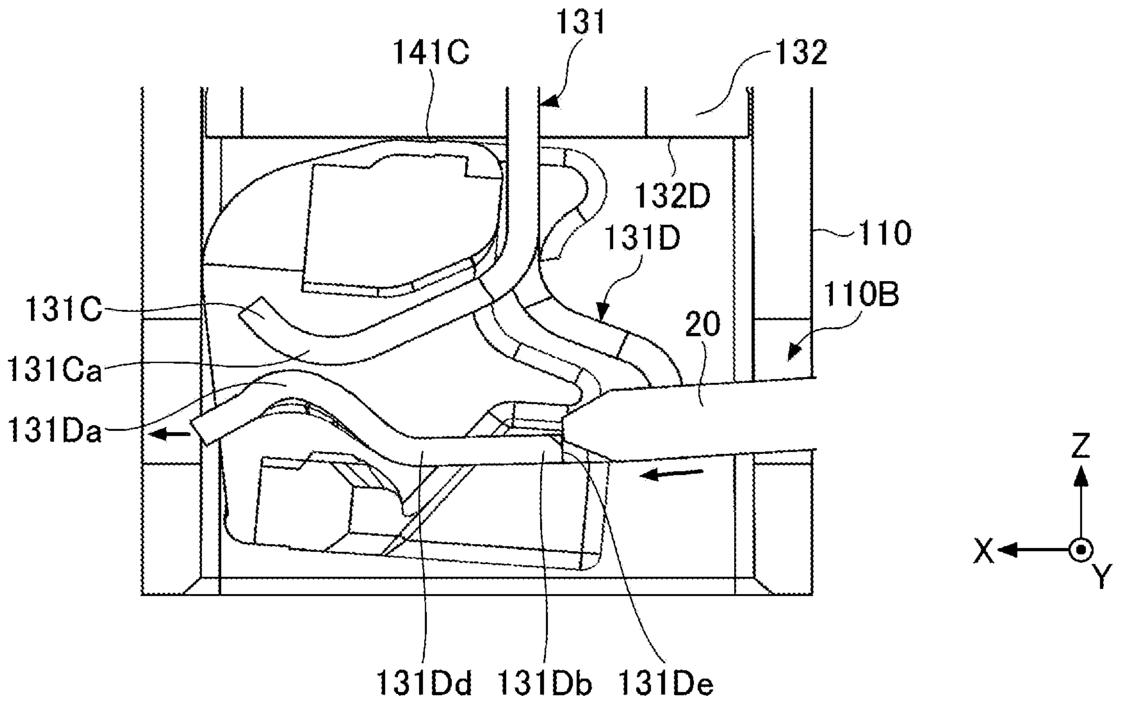
FIG. 23A is a partially enlarged cross-sectional view for explaining the operation of the auxiliary member in the switching device according to one embodiment.
Figure 23B:
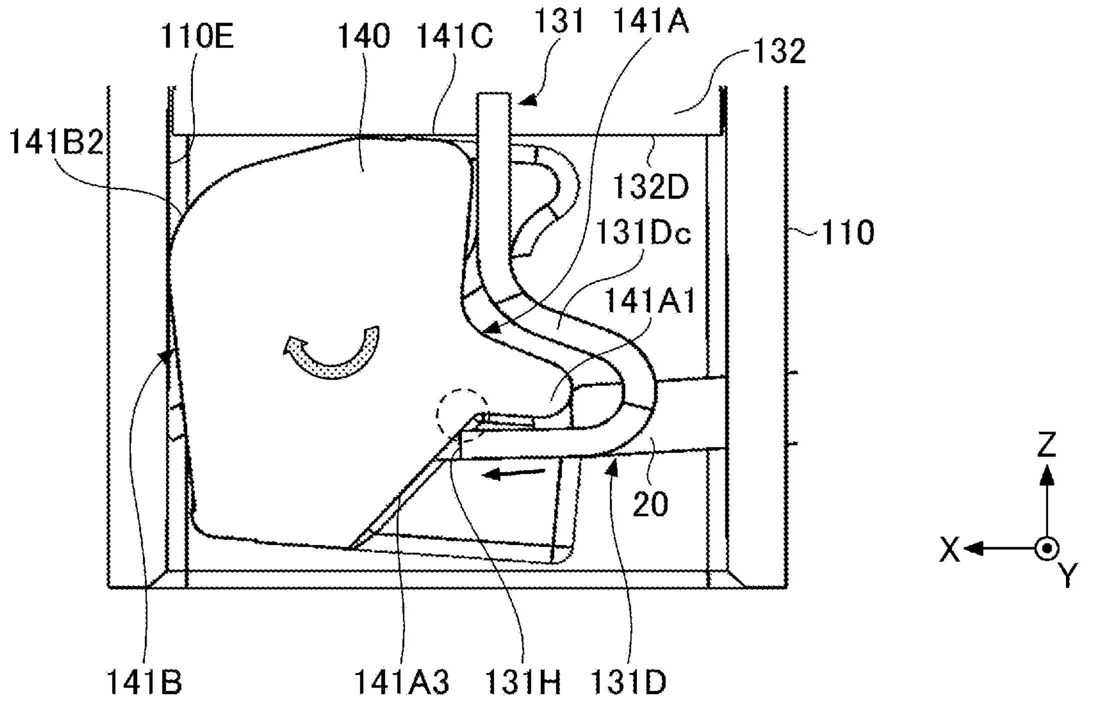
FIG. 23B is a partially enlarged cross-sectional view for explaining the operation of the auxiliary member in the switching device according to one embodiment.

Then, as shown in FIG. 23A, the external terminal 20 is pushed further forward (in the positive X-axis direction) while the tip of the external terminal 20 is still in contact with the contact part 131De, the terminal part 131D moves forward (in the positive X-axis direction) in response to the pressing load from the external terminal 20. At this time, as shown in FIG. 23B, the preloading part 131H, formed at the tip of the fold-back part 131Dc, pushes the inclined part 141A3 of the auxiliary member 140 forward. By this means, while the curved surface part 141B2, provided in the outermost part (with respect to an inner wall surface 110E) on the front surface 141B is in contact with the inner wall surface 110E of the housing 110, the inclined part 141A3, provided below the curved surface part 141B2 of the back surface 141A, is pressed. As a result of this, the curved surface part 141B2 serves as a "rotation fulcrum" and a "center of rotation," and the auxiliary member 140 rotates such that the front surface 141B rotates upward and the back surface 141A rotates downward.

Figure 24A:
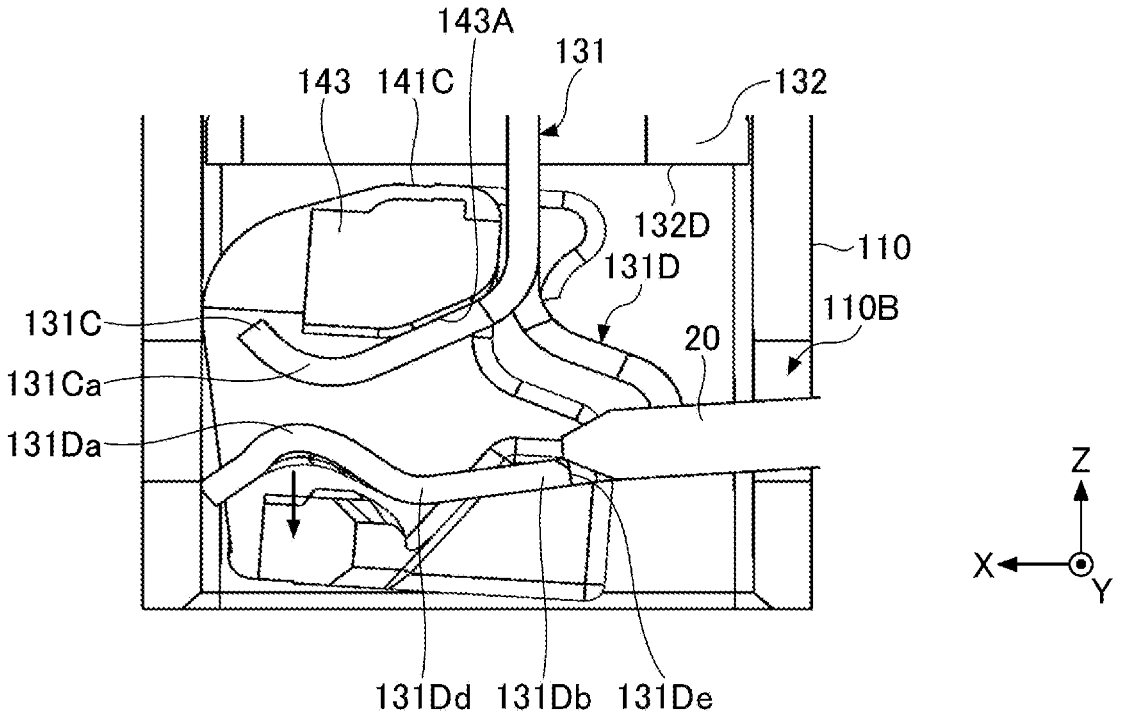
FIG. 24A is a partially enlarged cross-sectional view for explaining the operation of the auxiliary member in the switching device according to one embodiment.
Figure 24B:
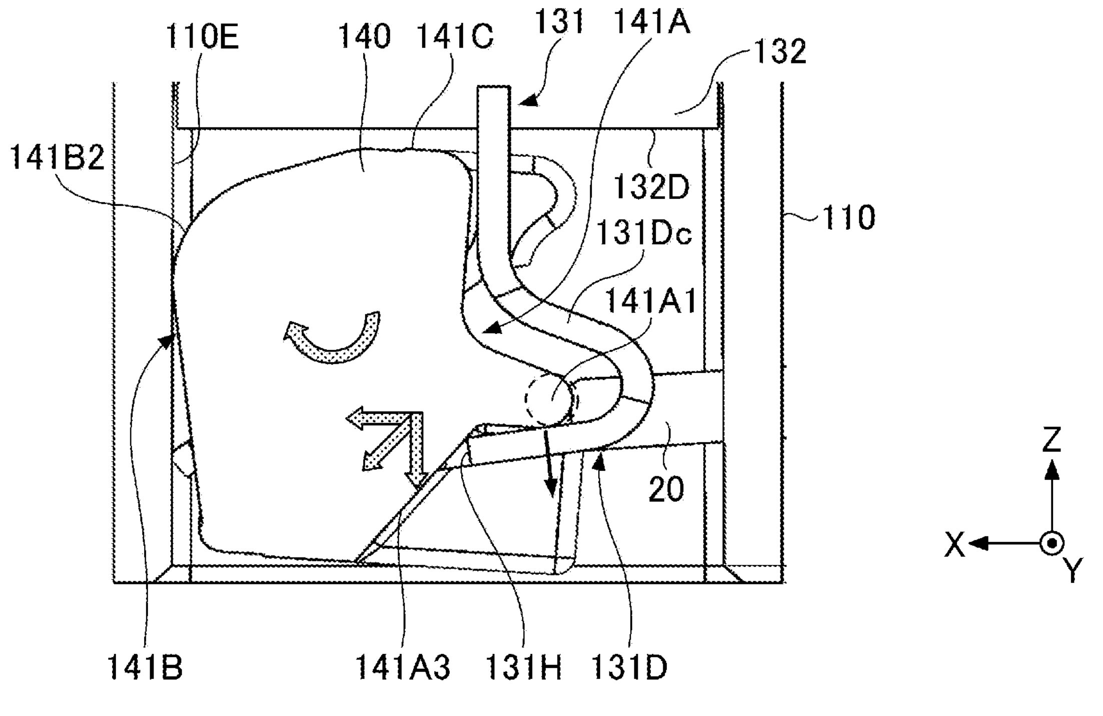
FIG. 24B is a partially enlarged cross-sectional view for explaining the operation of the auxiliary member in the switching device according to one embodiment.
Figure 25A:
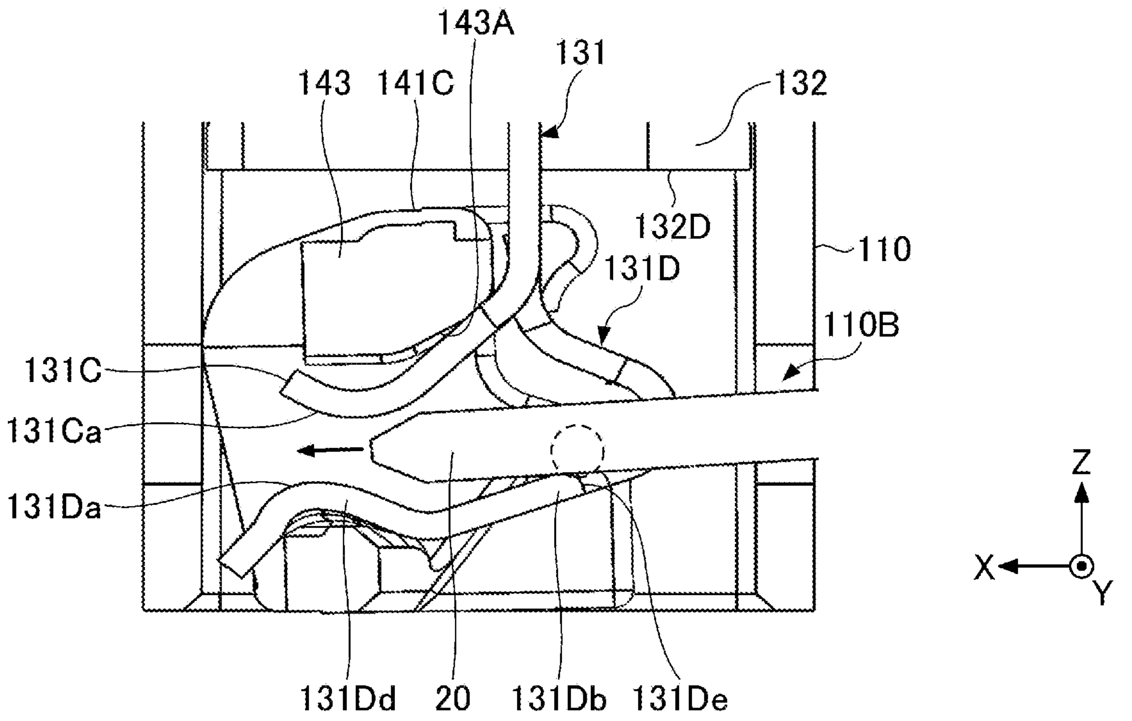
FIG. 25A is a partially enlarged cross-sectional view for explaining the operation of the auxiliary member in the switching device according to one embodiment.

As shown in FIG. 24B, as the auxiliary member 140 rotates, the protruding part 141A1 provided on the back surface 141A of the auxiliary member 140 thrusts the fold-back part 131Dc of the terminal part 131D downward (in the negative Z-axis direction). By this means, as shown in FIG. 25A, the fold-back part 131Dc is deformed elastically, and the coupling part 131Db and the extending part 131Dd, which are connected with the fold-back part 131Dc, move downward (in the negative Z-axis direction). As a result of this, as shown in FIG. 25A, the gap between the contact part 131Ca of the terminal part 131C and the contact part 131Da of the terminal part 131D is expanded. Also, as shown in FIG. 25A, since the coupling part 131Db moves downward, the external terminal 20 that is caught by the contact part 131De is set free.

Note that, since the upper surface 141C of the auxiliary member 140 contacts the bottom surface 132D (that is, the top surface) of the resin part 132, the rotation of the auxiliary member 140 is stopped at a predetermined rotation angle. By this means, when the terminal part 131D is pushed downward by the protruding part 141A1 to a certain extent, the terminal part 131D is no longer pushed downward. That is, the upper surface 141C is an example of a "controlling surface" that limits the rotation angle of the auxiliary member 140 to a predetermined angle by contacting another member inside the housing 110.

Figure 25B:
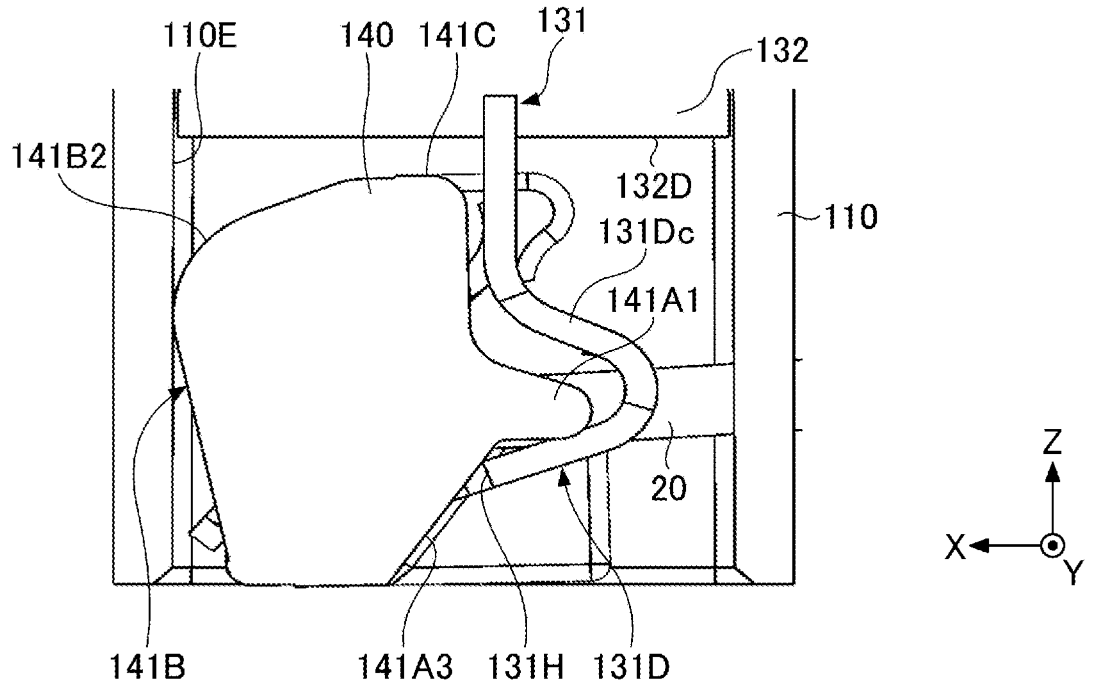
FIG. 25B is a partially enlarged cross-sectional view for explaining the operation of the auxiliary member in the switching device according to one embodiment.
Figure 26A:
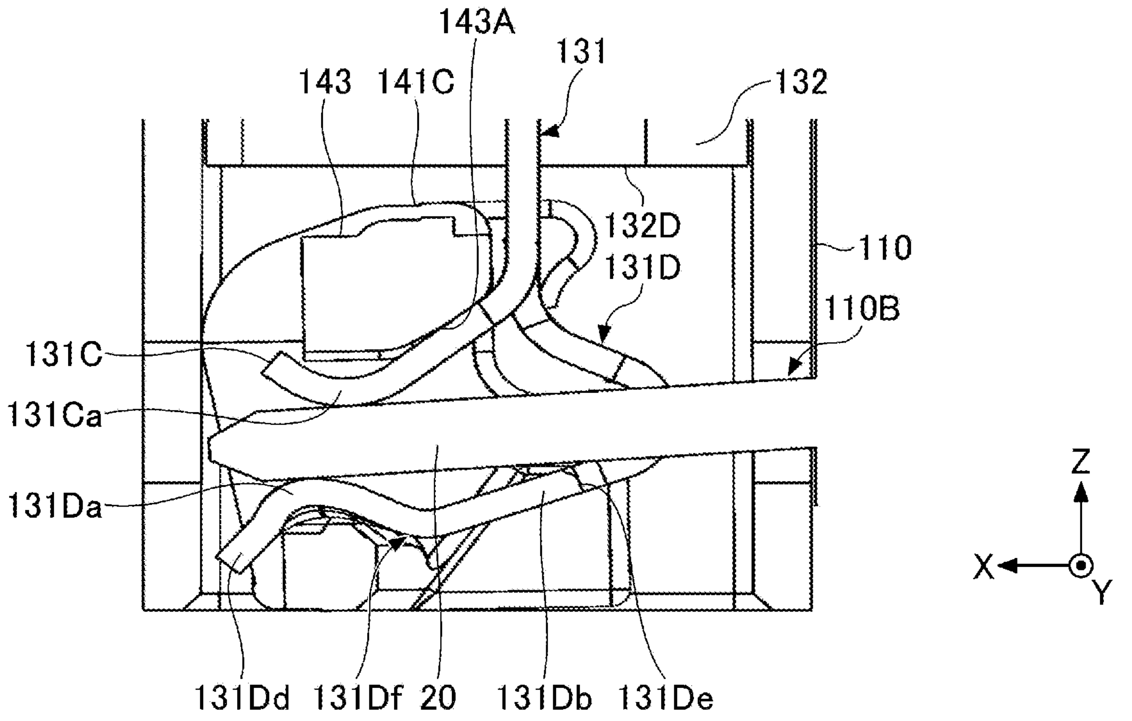
FIG. 26A is a partially enlarged cross-sectional view for explaining the operation of the auxiliary member in the switching device according to one embodiment.
Figure 26B:
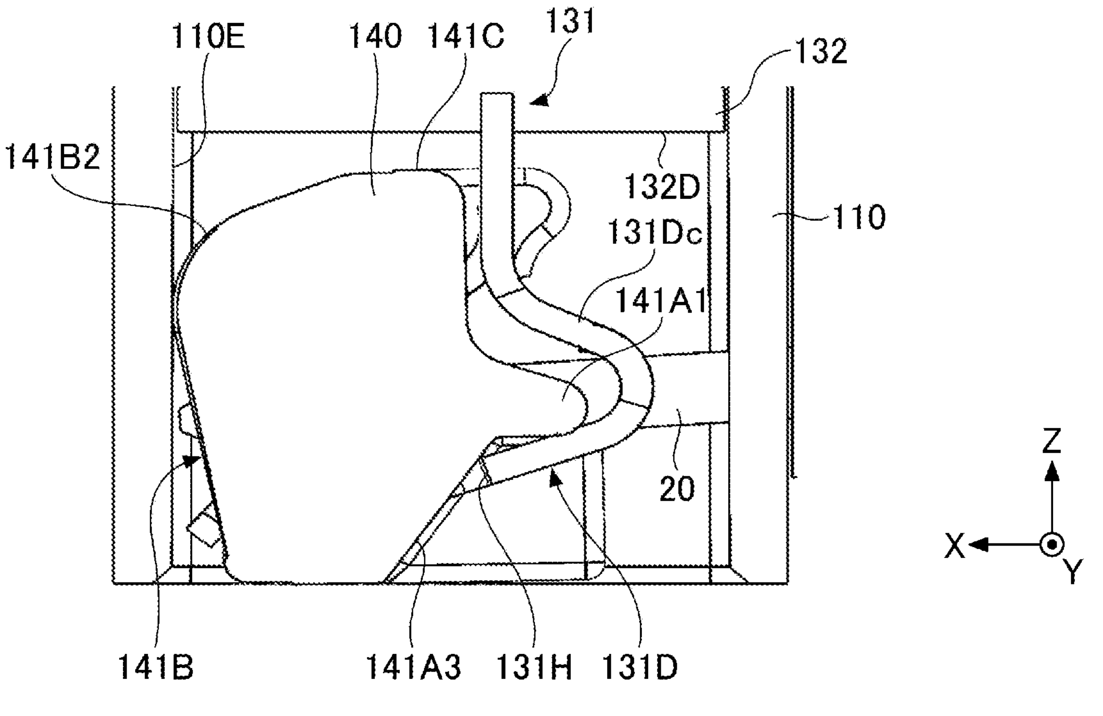
FIG. 26B is a partially enlarged cross-sectional view for explaining the operation of the auxiliary member in the switching device according to one embodiment.

Then, as shown in FIG. 25 and FIG. 26, the terminal part 131D is pushed downward by the protruding part 141A1 of the auxiliary member 140, and the external terminal 20 in contact with (caught by) the contact part 131De is set free, so that the external terminal 20 can move forward, without pushing the terminal part 131D forward, and smoothly enter the gap between the contact part 131Ca and the contact part 131Da, widened by the protruding part 141A1 of the auxiliary member 140.

Note that, after the auxiliary member 140 rotates and the external terminal 20 is inserted between the pair of terminal parts 131C and 131D as described above, as shown in FIG. 26A, a press part 131Df, formed in a lower surface of the terminal part 131D, pushes the auxiliary member 140 downward, thereby rotating the auxiliary member 140 in the opposite direction. This allows the upper wall part 143 of the auxiliary member 140 to position the support surface 143A near to an upper part of the inclined surface of the terminal part 131C, so that, when the terminal part 131C is lifted excessively upward by the external terminal 20, it is possible to control this upward lift of the terminal part 131C by way of contact. Note that the external terminal 20 shown in FIG. 26 is shown tilted to the lower left, in order to explain the state of the insertion process of the external terminal 20. In reality, however, during the process in which the external terminal 20 is inserted between the terminal part 131C and the terminal part 131D, the positioning of the external terminal 20 is corrected such that the external terminal 20 is pushed up and guided in the direction to extend horizontally (in the X-axis direction). As described above, the switching device 100 according to one embodiment can substantially prevent the gap between a pair of terminal parts 131C and 131D from being expanded, and hold the external terminal 20 between the pair of terminal parts 131C and 131D more appropriately.

As explained above, the switching device 100 according to one embodiment includes: a metallic terminal member 131 that is positioned inside a housing 110 and that includes a pair of a first terminal part 131C and a second terminal part 131D, the first and second terminal parts 131C and 131D facing each other and configured to sandwich an external terminal 20 that is inserted into the housing 110 from outside; and a block-shaped auxiliary member 140 that is positioned to surround the first and second terminal parts 131C and 131D inside the housing 110, and that, when the external terminal 20 is inserted between the first and second terminal parts 131C and 131D, rotates in response to a load produced by the external terminal 20 and applied to the auxiliary member 140, thereby pushing the first terminal part 131D in a direction to move away from the second terminal part 131C.

By this means, with the switching device 100 according to one embodiment, even if the external terminal 20 is positioned imprecisely, inserted into the housing 110 without adjustment, and gets caught in the terminal part 131D, the terminal part 131D is pushed by the rotational movement of the auxiliary member 140 in a direction to move away from the other terminal part 131C, so that the external terminal 20 that is caught by the terminal part 131D is set free, the gap between the pair of terminal parts 131C and 131D is expanded, and, consequently, the external terminal 20 can be inserted between the pair of terminal parts 131C and 131D appropriately. It is therefore possible to substantially prevent the terminal part 131D from getting deformed plastically even when the external terminal 20 is positioned imprecisely, inserted into the housing 110 without adjustment, gets caught in the contact part 131De, and is pushed further in, so that it is possible to insert and accommodate the external terminal 20 in an appropriate position.

Although one embodiment of the present invention has been described in detail above, the present invention is by no means limited to this embodiment, and various alterations and changes can be made within the scope of the gist of the invention recited in the claims attached herewith.

The electrical connector of the present invention is not limited to application to a switching device, and may be applied to any other device.

Note that, as shown in FIG. 26, when the external terminal 20 is inserted into the gap between the contact part 131Ca and the contact part 131Da, the upper contact 131Ca may contact the upper wall part 143 in the opening part 145 of the auxiliary member 140, and the lower contact part 131Da may contact the lower wall part 144 in the opening part 145 of the auxiliary member 140.

By this means, the contact part 131Ca and the contact part 131Da can hold down the auxiliary member 140, so that it is possible to substantially prevent the auxiliary member 140 from rattling inside the housing 110. Also, by this means, it becomes possible to reduce the opening between the contact part 131Ca and the contact part 131Da in the vertical direction, and, consequently, substantially prevent deformation due to excessive opening of the contact part 131Ca and the contact part 131Da.

The invention claimed is:

1. An electrical connector comprising:

a metallic terminal member that is positioned inside a housing and that includes a pair of a first terminal part and a second terminal part, the first and second terminal parts facing each other and configured to sandwich an external terminal inserted into the housing from outside; and a block-shaped auxiliary member that is positioned to surround the first and second terminal parts inside the housing, and that, when the external terminal is inserted between the first and second terminal parts, rotates in response to a load produced by the external terminal and applied to the auxiliary member, thereby pushing the first terminal part in a direction to move away from the second terminal part.

2. The electrical connector according to claim 1, wherein the first terminal part has a contact part where a tip of the external terminal contacts the first terminal part, and wherein, when the contact part is pushed by the external terminal, the first terminal part preloads the auxiliary member so as to allow the auxiliary member to rotate.

3. The electrical connector according to claim 2, wherein the auxiliary member has an inclined part and a rotational fulcrum part that contacts an inner wall surface of the housing, wherein the first terminal part has a preloading part that contacts the inclined part, and wherein the preloading part allows the auxiliary member to rotate about the rotational fulcrum part by preloading the inclined part.

4. The electrical connector according to claim 1, wherein the auxiliary member has a protruding part that pushes the first terminal part in the direction to move away from the second terminal part when the auxiliary member rotates.

5. The electrical connector according to claim 1, wherein the auxiliary member has a controlling surface that limits a rotation angle of the auxiliary member to a predetermined angle by contacting another member inside the housing.

6. The electrical connector according to claim 1, wherein the auxiliary member has a supporting surface that, being preloaded by the second terminal part when the external terminal is inserted between the first and second terminal parts, allows the auxiliary member to rotate in an opposite rotation direction, and supports the second terminal part from outside.

7. The electrical connector according to claim 1, wherein, in the metallic terminal member, the first and second terminal parts are formed integrally by processing a single metallic plate.

8. The electrical connector according to claim 1, further comprising:

a plurality of pairs of first and second terminal parts provided in one direction; and a plurality of auxiliary members provided in the one direction and connected with one another.

9. A switching device comprising the electrical connector of claim 1.

* * * * *